United States Patent
Ahn et al.

(10) Patent No.: US 10,848,293 B2
(45) Date of Patent: *Nov. 24, 2020

(54) METHOD FOR TRANSMITTING ACK/NACK IN WIRELESS COMMUNICATION SYSTEM AND DEVICE USING SAME

(71) Applicant: LG Electronics Inc., Seoul (KR)

(72) Inventors: Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/773,660

(22) Filed: Jan. 27, 2020

(65) Prior Publication Data

US 2020/0162224 A1 May 21, 2020

Related U.S. Application Data

(63) Continuation of application No. 16/408,233, filed on May 9, 2019, now Pat. No. 10,608,803, which is a
(Continued)

(51) Int. Cl.
  *H04L 5/00* (2006.01)
  *H04L 1/00* (2006.01)
  (Continued)

(52) U.S. Cl.
  CPC ............ *H04L 5/0055* (2013.01); *H04L 1/003* (2013.01); *H04L 1/0026* (2013.01);
  (Continued)

(58) Field of Classification Search
  CPC .... H04L 5/0055; H04W 72/04; H04W 72/042
  See application file for complete search history.

(56) References Cited

U.S. PATENT DOCUMENTS 10,333,679 B2   6/2019  Ahn
2011/0268102 A1  11/2011 Zhu et al.
(Continued)

FOREIGN PATENT DOCUMENTS

CN       103493416      1/2014
CN       104205707     12/2014

OTHER PUBLICATIONS

Catt, "PUCCH for TDD eIMTA," 3GPP TGS RAN WG1 Meeting #76, R1-140069, Prague, Czech Republic, Feb. 10-14, 2014 (Feb. 9, 20•14), pp. 1-5, XP050735635.
(Continued)

*Primary Examiner* — Mansour Oveissi
(74) *Attorney, Agent, or Firm* — Fish & Richardson P.C.

(57) ABSTRACT

A method for transmitting a positive-acknowledgement/negative-acknowledgement (ACK/NACK) in a wireless communication system, performed by a wireless device, includes receiving a plurality of downlink (DL) grants on a plurality of serving cells, each DL grant including a counter downlink assignment index (DAI) and an ACK/NACK resource indicator (ARI), the counter DAI indicating an accumulative number of PDSCHs received by the wireless device for a corresponding DL grant, receiving a plurality of physical downlink shared channels (PDSCHs) associated with the plurality of DL grants, selecting one of a plurality of sets of PUCCH resources based on a payload size of uplink control information (UCI), the UCI including ACK/NACK bits for the plurality of PDSCHs, determining a PUCCH resource within the selected set of PUCCH resources based on an ARI included in the most recently received DL grant among the plurality of DL grants and transmitting the UCI by using a PUCCH format associated with the determined PUCCH resource.

8 Claims, 31 Drawing Sheets

Related U.S. Application Data continuation of application No. 15/539,424, filed as application No. PCT/KR2015/014547 on Dec. 31, 2015, now Pat. No. 10,333,679.

(60) Provisional application No. 62/098,347, filed on Dec. 31, 2014, provisional application No. 62/161,225, filed on May 13, 2015, provisional application No. 62/161,869, filed on May 14, 2015, provisional application No. 62/190,721, filed on Jul. 9, 2015, provisional application No. 62/203,922, filed on Aug. 12, 2015, provisional application No. 62/209,310, filed on Aug. 24, 2015, provisional application No. 62/216,346, filed on Sep. 9, 2015, provisional application No. 62/251,122, filed on Nov. 5, 2015.

(51) Int. Cl.
*H04L 1/18* (2006.01)
*H04W 72/04* (2009.01)
*H04W 72/12* (2009.01)

(52) U.S. Cl.
CPC .......... *H04L 1/1861* (2013.01); *H04L 1/1896* (2013.01); *H04L 5/00* (2013.01); *H04W 72/042* (2013.01); *H04W 72/0446* (2013.01); *H04W 72/12* (2013.01)

(56) References Cited

U.S. PATENT DOCUMENTS

| | | | |
|---|---|---|---|
| 2012/0236812 A1 | 9/2012 | Chen et al. | |
| 2013/0188535 A1 | 7/2013 | Seo | |
| 2013/0188590 A1* | 7/2013 | Aiba | H04L 1/1861 370/329 |
| 2013/0223300 A1 | 8/2013 | Yang et al. | |
| 2013/0223301 A1* | 8/2013 | Lee | H04L 1/1854 370/281 |
| 2014/0071864 A1 | 3/2014 | Seo et al. | |
| 2014/0119249 A1 | 5/2014 | Park | |
| 2014/0119284 A1 | 5/2014 | Baldemair et al. | |
| 2014/0126491 A1 | 5/2014 | Ekpenyong et al. | |
| 2014/0269453 A1 | 9/2014 | Papasakellariou | |
| 2014/0376424 A1 | 12/2014 | Seo et al. | |
| 2016/0192385 A1 | 6/2016 | Tooher et al. | |

OTHER PUBLICATIONS

Huawei et al., •PUCCH Transmission Enhancement, 3GPP TSG RJ.\N WG1 meeting #68bis, R1-121498, Jeju Korea, Mar. 26-30, 2012 (Mar. 20, 2012), 5 pages, XP050599777.

LG Electronics, "Remaining Details of HJ.\RQ Feedback for TDD elMTA," 3GPP TSG RAN WG1 Meeting #76, R1-140299, Prague, Czech Republic, Feb. 10-14, 2014 (Feb. 9, 2014), pp. 1-4, XP050735849.

Mediatek Inc., "PUCCH Format Switching for HARQ Feedback in Carrier Aggregation," 3GPP TSG RAN WG1 Meeting #62, R1-104543, Madrid, Spain, Aug. 23-27, 2010 {Aug. 17, 2010), 3 pages, XP050449845.

Qualcomm Incorporated, "Number of Bits Conveyed on Multi-bit-ACK PUCCH Format," 3GPP TSG-RAN WG1 #62, R1-104782, Madrid, Spain, Aug. 23-27, 2010 {Aug. 17, 2010), pp. 1-6, XP050598620.

Samsung, "Analysis of PUCCH Format 3 Transmit Diversity Schemes for Rel-11," 3GPP TSG-RAN1#66bis meeting, R1-113078, Zhuhai, China, Oct. 10-14, 2011 (Oct. 4, 2011), pp. 1-8, XP050538226.

3rd Generation Partnership Project; Technical Specification Group Radio Access Network; "Evolved Universal Terrestrial Radio Access (E-UTRA); Physical layer procedures (Release 10)," 3GPP TS 36.213 V10.13.0, dated Jun. 2015, 128 pages.

Catr, "Consideration on enhancement to UL control signalling for up to 32 component carriers," R1-153268, 3GPP TSG RAN WG1 Meeting #81, Fukuoka, Japan, dated May 25-29, 2015, 3 pages.

Nokia Networks, "Dynamic adaptation of HARQ-ACK feedback size and PUCCH format," R1-152810, 3GPP TSG-RAN WG1 Meeting #81, Fukuoka, Japan, dated May 25-29, 2015, 3 pages.

Samsung, "HARQ-ACK Transmission for Enhanced CA," R1-152851, 3GPP TSG RAN WG1 #81, Fukuoka, Japan, dated May 25-29, 2015, 4 pages.

U.S. Appl. No. 62/110,307, Gaal et al., "Uplink Control Channel for Acknowledging Increased Number of Downlink Component Carriers," dated Mar. 17, 2015, 120 pages.

* cited by examiner

FIG. 7

METHOD FOR TRANSMITTING ACK/NACK IN WIRELESS COMMUNICATION SYSTEM AND DEVICE USING SAME

CROSS-REFERENCE TO RELATED APPLICATIONS

This application is a continuation of U.S. patent application Ser. No. 16/408,233, filed on May 9, 2019, which is a continuation of U.S. patent application Ser. No. 15/539,424 filed on Jun. 23, 2017, which is a U.S. National Phase Application of International Application No. PCT/KR2015/014547, filed on Dec. 31, 2015, which claims priority under 35 U.S.C. 119(e) to U.S. Provisional Application No. 62/098,347, filed on Dec. 31, 2014, No. 62/161,225, filed on May 13, 2015, No. 62/161,869, filed on May 14, 2015, No. 62/190,721, filed on Jul. 9, 2015, No. 62/203,922, filed on Aug. 12, 2015, No. 62/209,310, filed on Aug. 24, 2015, No. 62/216,346, filed on Sep. 9, 2015, and No. 62/251,122, filed on Nov. 5, 2015, all of which are hereby expressly incorporated by reference into the present application.

BACKGROUND OF THE INVENTION

Field of the Invention

The present invention relates to wireless communication, and more particularly, to a method of transmitting a positive-acknowledgement (ACK)/negative-acknowledgement (NACK) for hybrid automatic repeat request (HARQ) in a wireless communication system, and an apparatus using the method.

Discussion of the Related Art

Third generation partnership project (3GPP) long term evolution-advanced (LTE-A) is a technology which satisfies a bandwidth of at most 100 MHz and a data rate of at most 1 Gbps. Carrier aggregation (CA) is one of techniques for increasing a maximum bandwidth by using a plurality of component carriers. One component carrier operates as one serving cell, and as a result, a terminal receives a service from a plurality of serving cells.

With an increase in the number of supported serving cells, an amount of feedback information reported by the terminal is also increased. The feedback information includes channel state information (CSI), HARQ ACK/NACK, or the like.

A physical uplink control channel (PUCCH) is defined for transmission of the feedback information. The existing 3GPP LTE-A provides only three PUCCH formats (i.e., a PUCCH format 1/1a/1b, a PUCCH format 2/2a/2b, a PUCCH format 3) depending on a payload size.

With an increase in the number of serving cells supported in the CA environment, a greater number of PUCCH formats with different payload sizes are required. In addition, how the terminal selects and uses the various PUCCH formats is an issue to be considered.

SUMMARY OF THE INVENTION

The present invention provides a method for transmitting an ACK/NACK in a wireless communication system, and an apparatus using the method.

In an aspect, a method for transmitting an ACK/NACK in a wireless communication system is provided. The method includes receiving, by a wireless device, downlink (DL) control information including a DL grant and an ACK/NACK resource indicator (ARI), receiving, by the wireless device, a DL transport block based on the DL grant, selecting, by the wireless device, a physical uplink control channel (PUCCH) format based on the ARI, determining, by the wireless device, a PUCCH resource for the selected PUCCH format based on the ARI, and transmitting, by the wireless device, an ACK/NACK for the DL transport block by using the selected PUCCH format.

The wireless device may receive a plurality of DL grants from a plurality of cells, and may receive a plurality of DL transport blocks based on the plurality of DL grants.

The PUCCH format may be selected as one of a first PUCCH format and a second PUCCH format based on the ARI.

In another aspect, an apparatus for transmitting an ACK/NACK in a wireless communication system includes a transceiver configured to transmit and receive a radio signal and a processor operatively coupled to the transceiver. The processor is configured to control the transceiver to receive downlink (DL) control information including a DL grant and an ACK/NACK resource indicator (ARI), control the transceiver to receive a DL transport block based on the DL grant, select a physical uplink control channel (PUCCH) format based on the ARI, determine a PUCCH resource for the selected PUCCH format based on the ARI, and control the transceiver to transmit an ACK/NACK for the DL transport block by using the selected PUCCH format.

A method of transmitting uplink control information is provided when a greater number of serving cells are configured.

BRIEF DESCRIPTION OF THE DRAWINGS

FIG. 7 shows another example of a channel structure for an extended PUCCH format.

DETAILED DESCRIPTION OF THE PREFERRED EMBODIMENTS

A wireless device may be fixed or mobile, and may be referred to as another terminology, such as a user equipment (UE), a mobile station (MS), a mobile terminal (MT), a user terminal (UT), a subscriber station (SS), a wireless device, a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a $3^{rd}$ generation partnership project (3GPP) long term evolution (LTE)/LTE-advanced (LTE-A). However, this is for exemplary purposes only, and thus the present invention is also applicable to various wireless communication networks.

The wireless device may be served by a plurality of serving cells. Each serving cell may be defined with a downlink (DL) component carrier (CC) or a pair of a DL CC and an uplink (UL) CC. The plurality of serving cells may be managed by one BS, or may be managed by a plurality of BSs. The plurality of serving cells may be divided into a plurality of cell groups.

The serving cell may be classified into a primary cell (PCell) and a secondary cell (SCell). The PCell operates at a primary frequency, and is a cell designated as the PCell when an initial network entry process is performed or when a network re-entry process starts or in a handover process. The PCell is also called a reference cell. The SCell operates at a secondary frequency. The SCell may be configured after a radio resource control (RRC) connection is established, and may be used to provide an additional radio resource. At least one PCell is configured always. The SCell may be added, modified, or released by using higher-layer signaling (e.g., an RRC message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
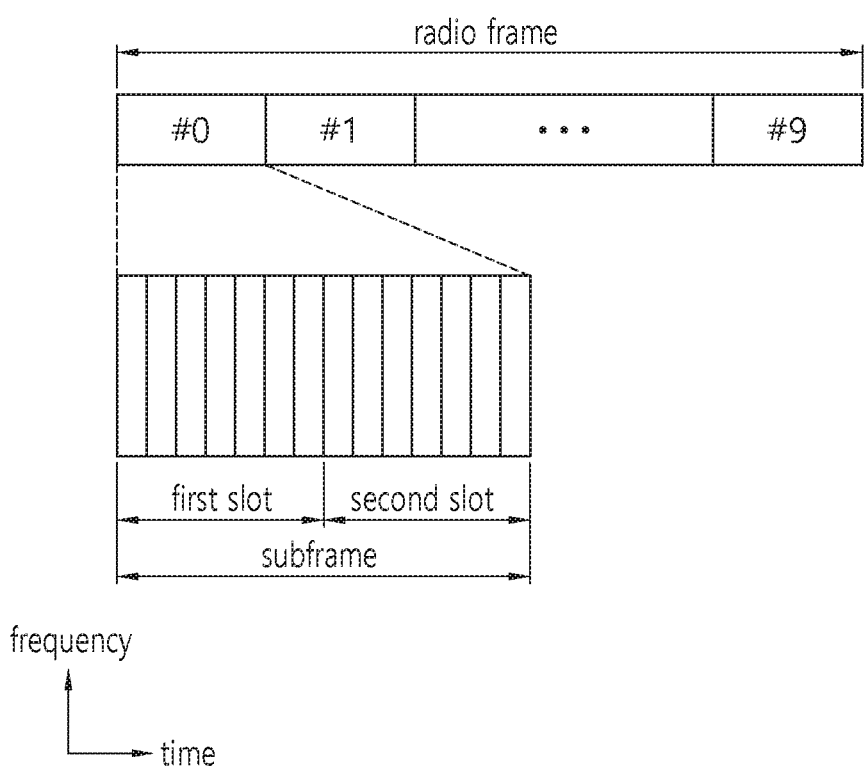
FIG. 1 shows a subframe structure in $3^{rd}$ generation partnership project (3GPP) long term evolution-advanced (LTE-A).

FIG. 1 shows a subframe structure in 3GPP LTE-A.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

A subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 14 OFDM symbols for example, the number of OFDM symbols included in one slot may vary depending on a length of a cyclic prefix (CP). According to 3GPP LTE-A, in case of a normal CP, one slot includes 14 OFDM symbols, and in case of an extended CP, one slot includes 12 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB may include 7×12 resource elements (REs).

A physical channel of 3GPP LTE-A may be classified into a downlink (DL) physical channel and an uplink (UL) physical channel. The DL physical channel includes a physical downlink control channel (PDCCH), a physical control format indicator channel (PCFICH), a physical hybrid-ARQ indicator channel (PHICH), and a physical downlink shared channel (PDSCH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for an uplink hybrid automatic repeat request (HARD). The ACK/NACK signal for uplink (UL) data on a PUSCH transmitted by the wireless device is transmitted on the PHICH.

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The UL physical channel includes a physical uplink control channel (PUCCH) and a physical uplink shared channel (PUSCH). The PUCCH is allocated in an RB pair in a subframe. RBs belonging to the RB pair occupy different subcarriers in each of a $1^{st}$ slot and a $2^{nd}$ slot. The PUSCH is allocated by a UL grant on the PDCCH. In a normal CP, a $4^{th}$ OFDM symbol of each slot is used in transmission of a demodulation reference signal (DMRS) for the PUSCH.

Uplink control information (UCI) includes at least any one of HARQ ACK/NACK, channel state information (CSI), and a scheduling request (SR). Hereinafter, as an indicator for indicating a state of a downlink (DL) channel, the CSI may include at least any one of a channel quality indicator (CQI) and a precoding matrix indicator (PMI).

In order to transmit a variety of UCI on a PUCCH, a combination between the UCI and the PUCCH is defined as a PUCCH format as shown in the following table.

TABLE 1

| PUCCH format | UCI to be transmitted |
| --- | --- |
| PUCCH format 1 | Positive SR |
| PUCCH format 1a/1b | 1-bit or 2-bit HARQ ACK/NACK |
| PUCCH format 2 | CSI report |
| PUCCH format 2a/2b | CSI report and 1-bit or 2-bit HARQ ACK/NACK |
| PUCCH format 3 | HARQ ACK/NACK, SR, CSI |

The PUCCH format 1a/1b is used to carry the 1-bit or 2-bit HARQ ACK/NACK by using binary phase shift keying (BPSK) modulation or quadrature phase shift keying (QPSK) modulation.

The PUCCH format 3 is used to carry encoded UCI of 48 bits. The PUCCH format 3 may carry HARQ ACK/NACK for a plurality of serving cells and a CSI report for one serving cell.

Figure 2:
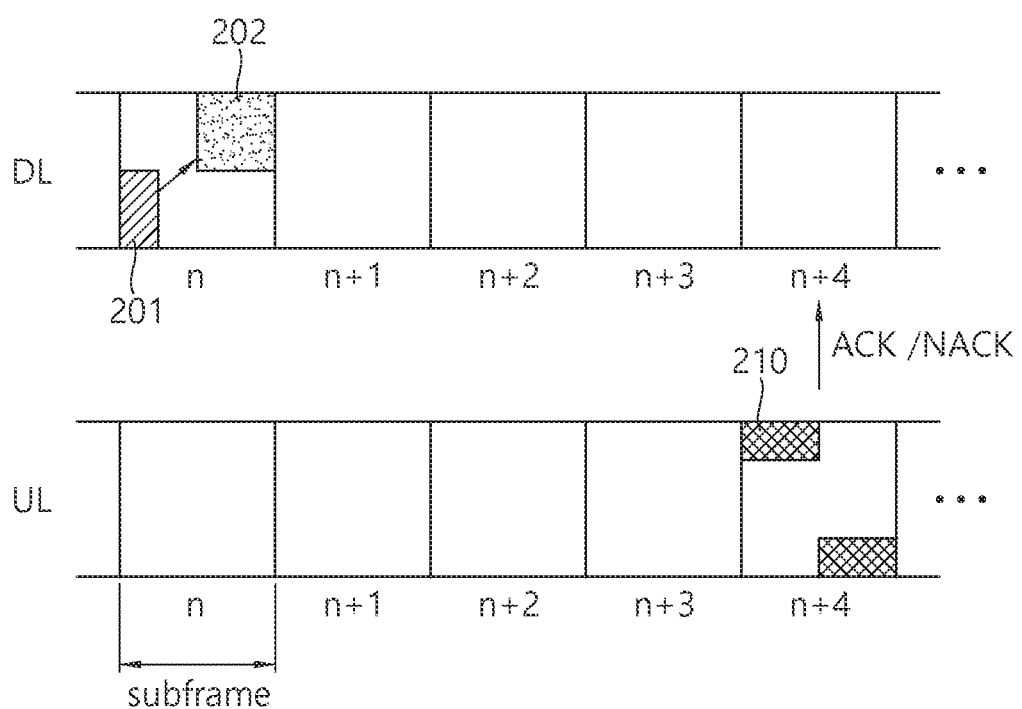
FIG. 2 shows an example of performing hybrid automatic repeat request (HARQ).

FIG. 2 shows an example of performing HARQ.

A wireless device monitors a PDCCH, and receives a DL grant including a DL resource allocation on a PDCCH 201 (or EPDDCH) in a DL subframe n. The wireless device receives a DL transport block through a PDSCH 202 indicated by the DL resource allocation.

The wireless device transmits an ACK/NACK signal for the DL transport block on a PUCCH 210 in a UL subframe n+4. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE-A, 3 types of PUCCH formats (i.e., a PUCCH format 1/1a/1b, a PUCCH format 2/2a/2b, a PUCCH format 3) are used to carry an ACK/NACK signal which is a reception acknowledgement for HARQ. All PUCCH formats use different resource blocks in two slots.

Figure 3:
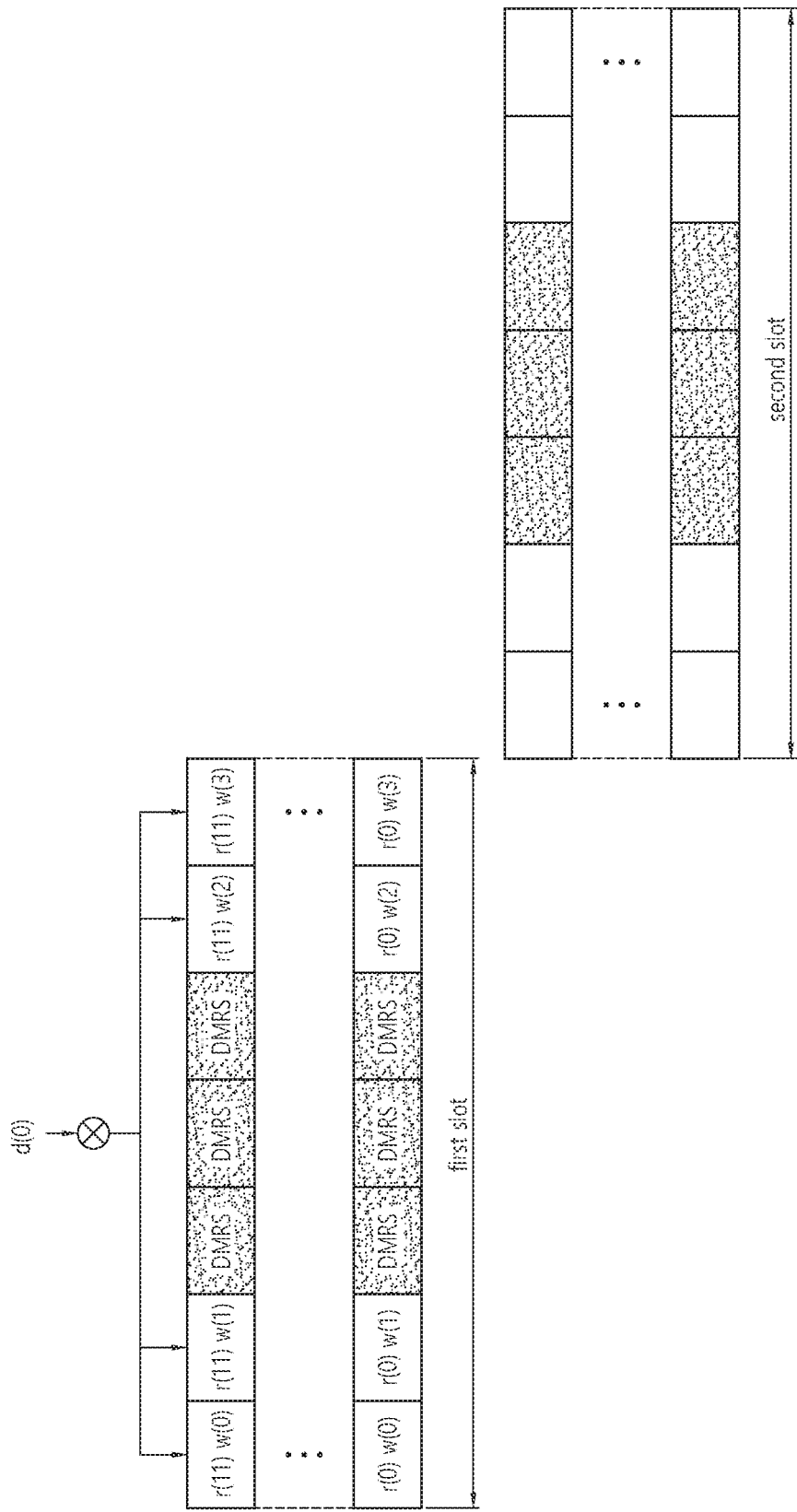
FIG. 3 shows an example of a channel structure for a physical uplink control channel (PUCCH) format 1/1a/1b.

FIG. 3 shows an example of a channel structure for a PUCCH format 1/1a/1b.

One slot includes 7 OFDM symbols. 3 OFDM symbols in the middle are reference signal (RS) OFDM symbols for DMRS. The remaining 4 OFDM symbols are data OFDM symbols for UCI.

A data symbol d(0) is first spread in a frequency domain by using a frequency-domain sequence R(i)={r(0), r(1), r(2), r(3), r(4), r(5), r(6), r(7), r(8), r(9), r(10), r(11)}. The frequency-domain spreading includes that r(i) corresponds to each subcarrier in a resource block. Although not shown, a frequency-domain sequence in each OFDM symbol may be generated by being cyclically shifted by a cyclic shift vale from a basis sequence. The cyclic shift value may be acquired on the basis of a corresponding OFDM symbol index.

The sequence generated by being spread in the frequency domain is spread again in a time domain by using an orthogonal code W(j)={w(0), w(1), w(2), w(3)}. The time-domain spreading includes that w(i) corresponds to each OFDM symbol in a slot.

The data symbol d(0) is used equally in a first slot and a second slot. The PUCCH format 1a uses binary phase shift keying (BPSK) for a data symbol, and carries 1-bit ACK/NACK. The PUCCH format 1b uses quadrature phase shift keying (QPSK) for a data symbol, and carries 2-bit ACK/NACK.

Figure 4:
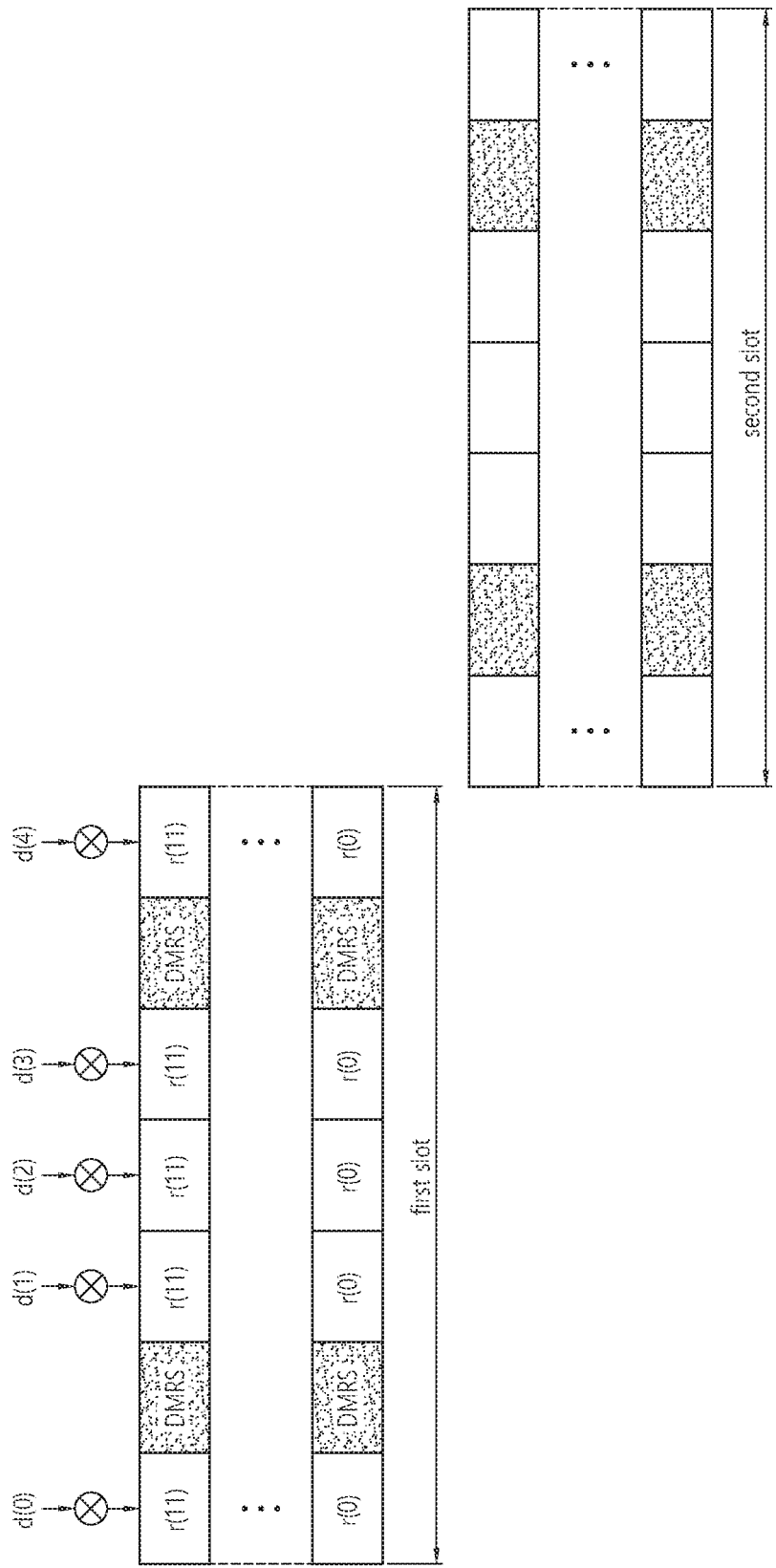
FIG. 4 shows an example of a channel structure for a PUCCH format 2/2a/2b.

FIG. 4 shows an example of a channel structure for a PUCCH format 2/2a/2b.

One slot includes 7 OFDM symbols. $2^{nd}$ and $6^{th}$ OFDM symbols are RS OFDM symbols for DMRS. The remaining 5 OFDM symbols are data OFDM symbols for UCI.

The PUCCH format 2/2a/2b uses only frequency-domain spreading without time-domain spreading. The frequency-domain spreading is achieved by using a frequency-domain sequence R(i)={r(0), r(1), r(2), r(3), r(4), r(5), r(6), r(7), r(8), r(9), r(10), r(11)}. The frequency-domain spreading includes that r(i) corresponds to each subcarrier in a resource block. Although not shown, a frequency-domain sequence in each OFDM symbol may be generated by being cyclically shifted by a cyclic shift vale from a basis sequence. The cyclic shift value may be acquired on the basis of a corresponding OFDM symbol index.

5 data symbols may be transmitted in each slot. Therefore, 10 data symbols d(0) to d(9) may be transmitted in one subframe. When using QPSK, the PUCCH format 2/2a/2b may carry 20 encoded bits. Although not shown, ACK/NACK is transmitted by using a phase offset of 2 RS OFDM symbols. The PUCCH format 2a uses BPSK for a phase offset, and carries 1-bit ACK/NACK. The PUCCH format 2b uses QPSK for a phase offset, and carries 2-bit ACK/NACK.

Figure 5:
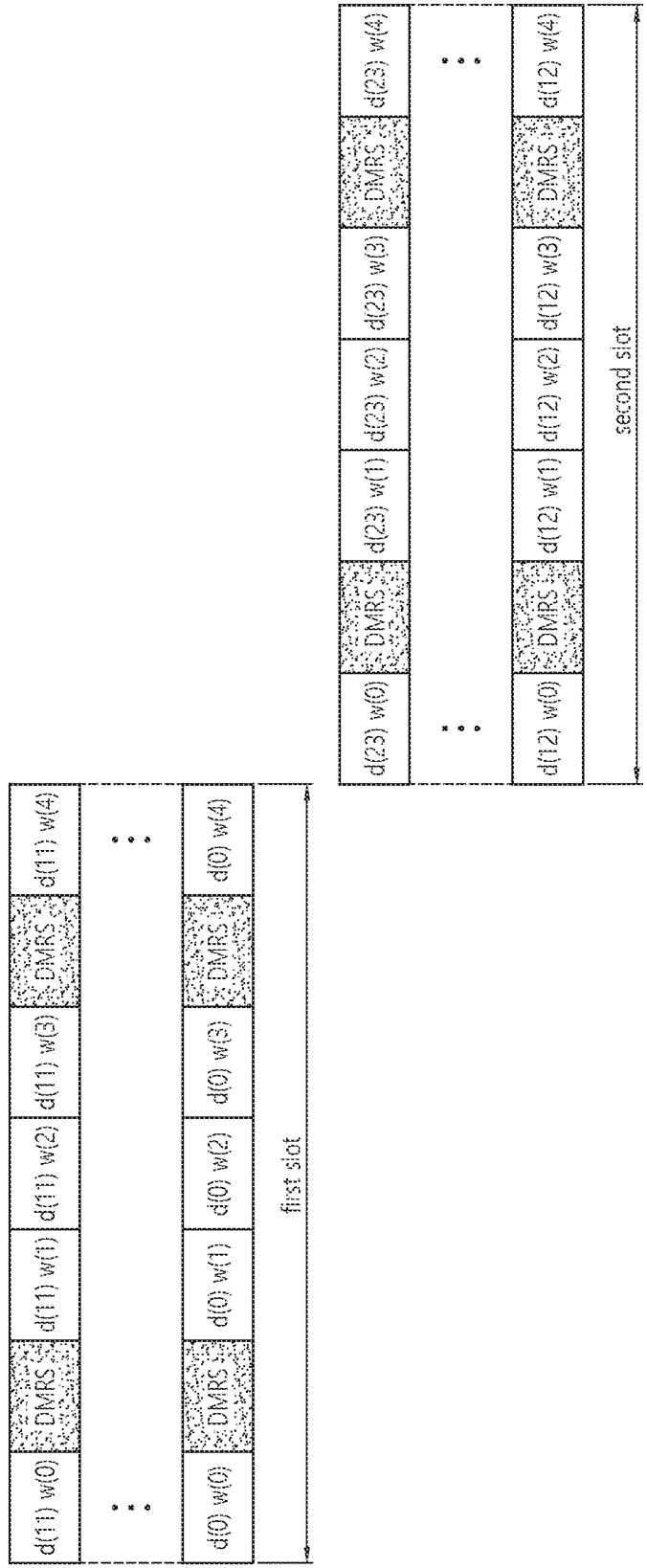
FIG. 5 shows an example of a channel structure for a PUCCH format 3.

FIG. 5 shows an example of a channel structure for a PUCCH format 3.

One slot includes 7 OFDM symbols. 2nd and $6^{th}$ OFDM symbols are RS OFDM symbols for DMRS. The remaining 5 OFDM symbols are data OFDM symbols for UCI.

The PUCCH format 3 may carry 24 data symbols d(0) to d(23). When using QPSK, the PUCCH format 3 may carry 48 encoded bits.

In a first slot, first 12 data symbols d(0) to d(11) are spread in a time domain by using an orthogonal code W(j)={w(0), w(1), w(2), w(3), w(4)}. The time-domain spreading includes that w(i) corresponds to each OFDM symbol in a slot. In a second slot, second 12 data symbols d(12) to d(23) are spread in the time domain by using the orthogonal code W(j).

A time/frequency/code resource used in PUCCH transmission is called a PUCCH resource. For example, an orthogonal code index, a cyclic shift index, and a resource block index are required for the PUCCH format 1/1a/1b. A cyclic shift index and a resource block index are required for the PUCCH format 2/2a/2b. An orthogonal code index and a resource block index are required for the PUCCH format 2/2a/2b. A resource index is a parameter used to determine a corresponding PUCCH resource.

A resource index for the PUCCH format 1a/1b for ACK/NACK is given by a corresponding DL grant. Although a resource index for the PUCCH format 3 for ACK/NACK is given by a corresponding DL grant, this is designated in a pre-designated resource index set. For example, a BS pre-designates 4 resource indices for the PUCCH format 3 through an RRC message. In addition, one of the 4 resource indices may be designated through a resource indicator in a DL grant (this is called an 'ACK/NACK resource indicator (ARI)'). If the ARI is 2 bits, it may be defined as follows.

TABLE 2

| ARI value | PUCCH resource |
|---|---|
| 00 | first PUCCH resource index |
| 01 | second PUCCH resource index |
| 10 | third PUCCH resource index |
| 11 | fourth PUCCH resource index |

A size of UCI payload that can be carried using the PUCCH format 3 is at most 21 bits. The UCI payload includes the number of information bits before being encoded. However, with an increase in the number of serving cells configured for the wireless device, a required UCI payload size may be more increased.

First, a channel structure of a PUCCH format for the increased UCI payload is described.

For convenience, the PUCCH format for UCI transmission is defined as follows.

1) PUCCHx: A PUCCH format for 1-bit or 2-bit UCI transmission (e.g., a PUCCH format 1/1a/1b)

2) PUCCHy: A PUCCH format for UCI transmission of at most M bits (M>2) (e.g., a PUCCH format 3)

3) PUCCHz: A PUCCH format for UCI transmission exceeding M bits. This is also referred to as an extended PUCCH format.

Figure 6:
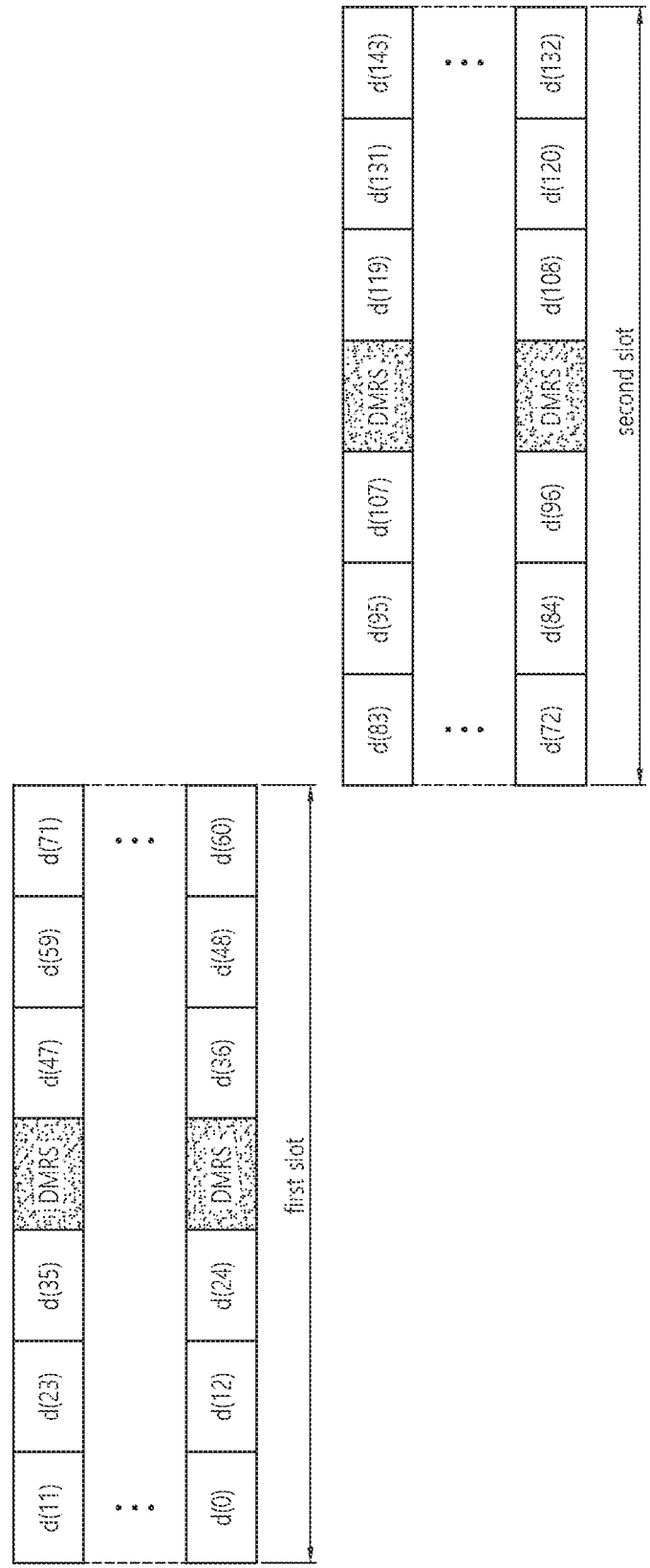
FIG. 6 shows an example of a channel structure for an extended PUCCH format.

FIG. 6 shows an example of a channel structure for an extended PUCCH format.

One slot includes 7 OFDM symbols. An OFDM symbol in the middle (i.e., a $4^{th}$ OFDM symbol) is an RS OFDM symbol for DMRS. The remaining 6 OFDM symbols are data OFDM symbols for UCI. If one slot includes 6 OFDM symbols, a $3^{rd}$ OFDM symbol is an RS OFDM symbol, and the remaining 5 OFDM symbols are data OFDM symbols.

The extended PUCCH format does not use frequency-domain spreading and time-domain spreading. When one resource is allocated to the extended PUCCH format, 12 data symbols may be transmitted for each OFDM symbol. Therefore, 144 data symbols d(0) to d(143) may be transmitted in one subframe. When using QPSK, the extended PUCCH format may carry 288 encoded bits.

Figure 7:
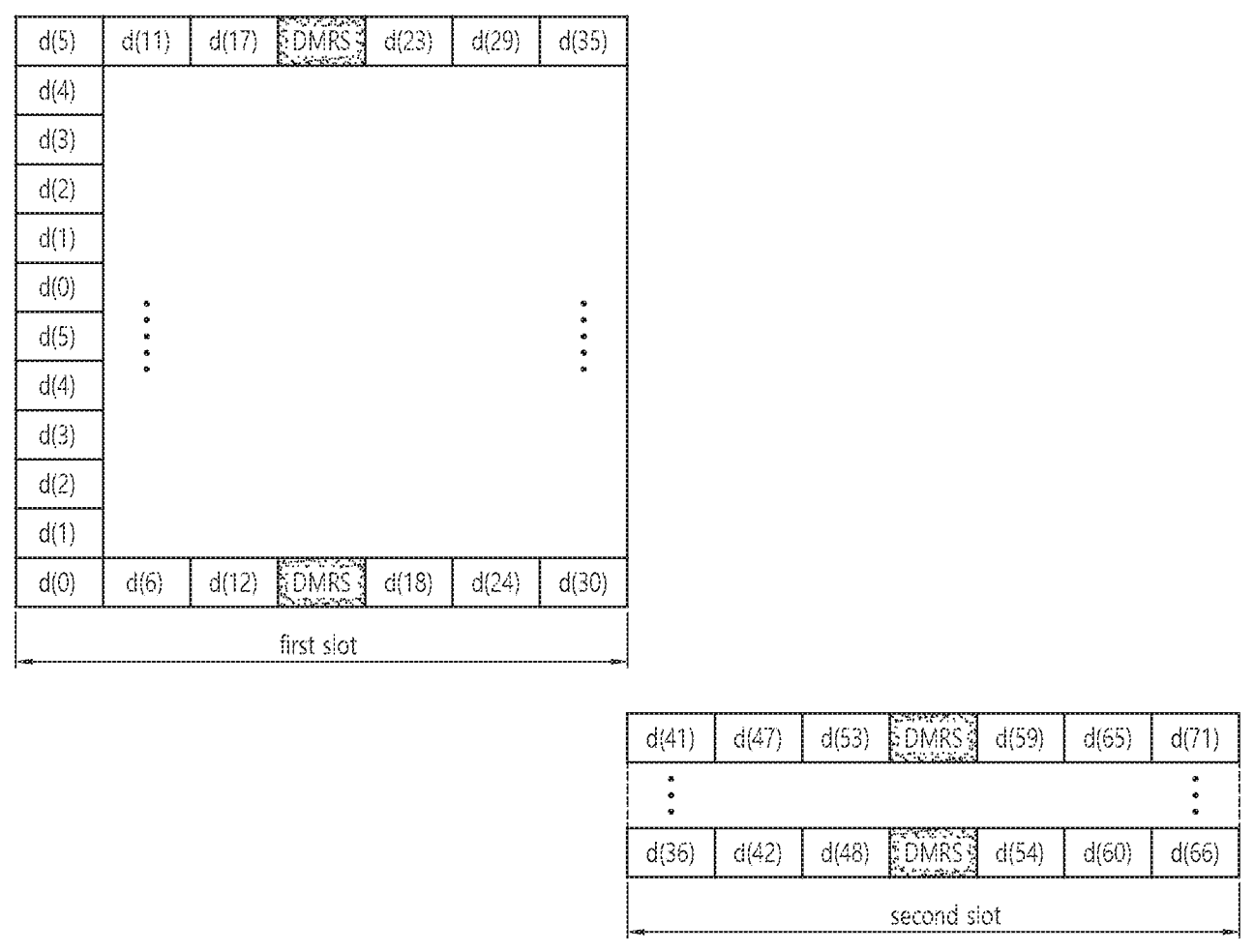

FIG. 7 shows another example of a channel structure for an extended PUCCH format.

In comparison with the channel structure of FIG. 6, 6 data symbols are repeated in one resource block for each OFDM symbol. For example, {d(0), d(1), d(2), d(3), d(4), d(5), d(0), d(1), d(2), d(3), d(4), d(5)} is transmitted in a first OFDM symbol. Accordingly, although 144 data symbols can be transmitted in the channel structure of FIG. 6, 72 data symbols d(0) to d(71) may be transmitted in this channel structure. When using QPSK, the extended PUCCH format may carry 144 encoded bits.

In order to support multi-user multiplexing, code division multiplexing (CDM) may be supported in a data symbol repeated in each OFDM symbol. For example, {+d(0), +d(1), +d(2), +d(3), +d(4), +d(5), +d(0), +d(1), +d(2), +d(3), +d(4), d(5)} may be transmitted through CDM 0, and {+d(0), +d(1), +d(2), +d(3), +d(4), +d(5), −d(0), −d(1), −d(2), −d(3), −d(4), −d(5)} may be transmitted through CDM 1. A cyclic shift value used in DMRS may vary depending on the CDM.

For convenience, the channel structure of FIG. 6 is denoted by PUCCHz1, the channel structure of FIG. 7 is denoted by PUCCHz2, and these channels are collectively denoted by PUCCHz.

A plurality of resource blocks may be allocated to the PUCCHz. That is, only one resource block may be allocated to the existing PUCCHx/y, whereas one or more resource blocks may be allocated to the PUCCHz. This means that a bandwidth at which the PUCCHz is transmitted is the same as or greater than a bandwidth at which the PUCCHx/y is transmitted.

A BS may inform each wireless device of an indication regarding whether to use the PUCCHz1 or the PUCCHz2. Each wireless device may confirm whether to use a corresponding PUCCH format through a resource configuration of the PUCCHz1 or a resource configuration of the PUCCHz2. The BS may instruct to use both the PUCCHz1 and the PUCCHz2. The wireless device may select one of the PUCCHz1 and the PUCCHz2 according to a criterion for selecting a PUCCH format described below.

Similarly to the configuration of the PUCCH format 3, in the resource configuration for the PUCCHz, a plurality of candidate resources may be configured in advance through an RRC message, and one of the plurality of candidate resources may be designated through a DL grant.

Now, a criterion for selecting a PUCCH format used in UCI transmission from a plurality of PUCCH formats is described. Although it is described hereinafter that one of the PUCCHy and the PUCCHz is selected for example, it is also possible to select one of the PUCCHx and the PUCCHz or to select one of the PUCCHx, the PUCCHy, and the PUCCHz.

A plurality of selectable PUCCH formats may include a plurality of PUCCH formats having different resource blocks. Alternatively, the plurality of selectable PUCCH formats may include a plurality of PUCCH formats having different bandwidths. For example, one of a first PUCCHz having one resource block and a second PUCCHz having two resource blocks may be selected.

Selection of PUCCH Format Using DCI

Figure 8:
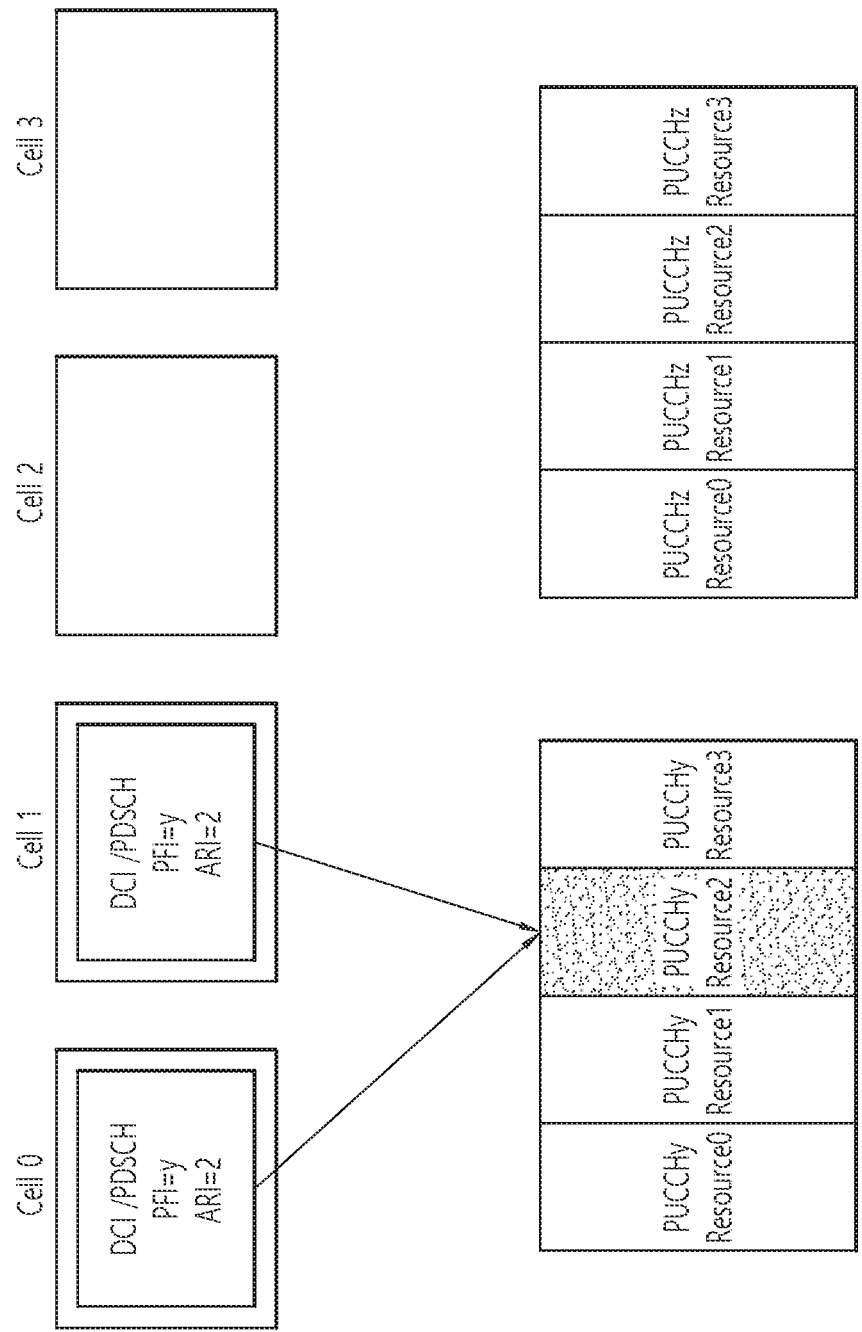
FIG. 8 shows an example of selecting a PUCCH format according to an embodiment of the present invention.

FIG. 8 shows an example of selecting a PUCCH format according to an embodiment of the present invention.

A PUCCH format used by a wireless device is reported through DCI transmitted in each serving cell. The DCI may include a PUCCH format indication (PFI) for reporting the PUCCH format and an ARI for reporting a resource of the PUCCH format.

The PFI may include information for identifying which format will be used between PUCCHy and PUCCHz. Each of a plurality of available candidate PUCCHy resources and candidate PUCCHz resources may be configured, and an ARI may designate one of a plurality of PUCCH resources for the selected PUCCH format.

The PFI may be transmitted only through DCI of an SCell other than DCI of a PCell, and may indicate the same value with respect to the same wireless device. It is shown herein that DCI of a cell 0 (PCell) has a PFI for designating PUCCHy, and DCI of a cell 1 (SCell) has a PFI for designating PUCCHy.

Figure 9:
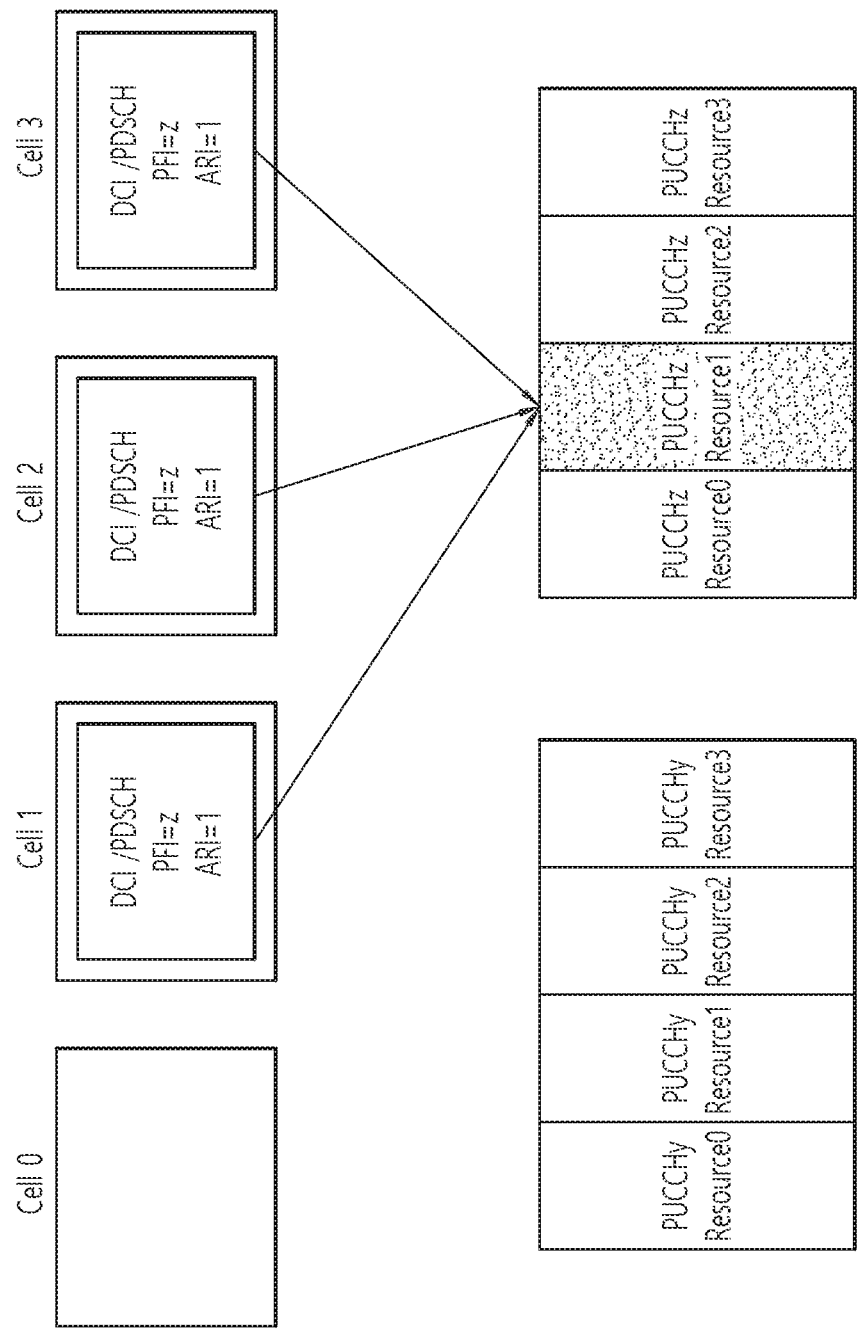
FIG. 9 shows another example of selecting a PUCCH format according to an embodiment of the present invention.

FIG. 9 shows another example of selecting a PUCCH format according to an embodiment of the present invention. It shows that DCI of a cell 1/2/3 has a PFI for designating PUCCHz.

Figure 10:
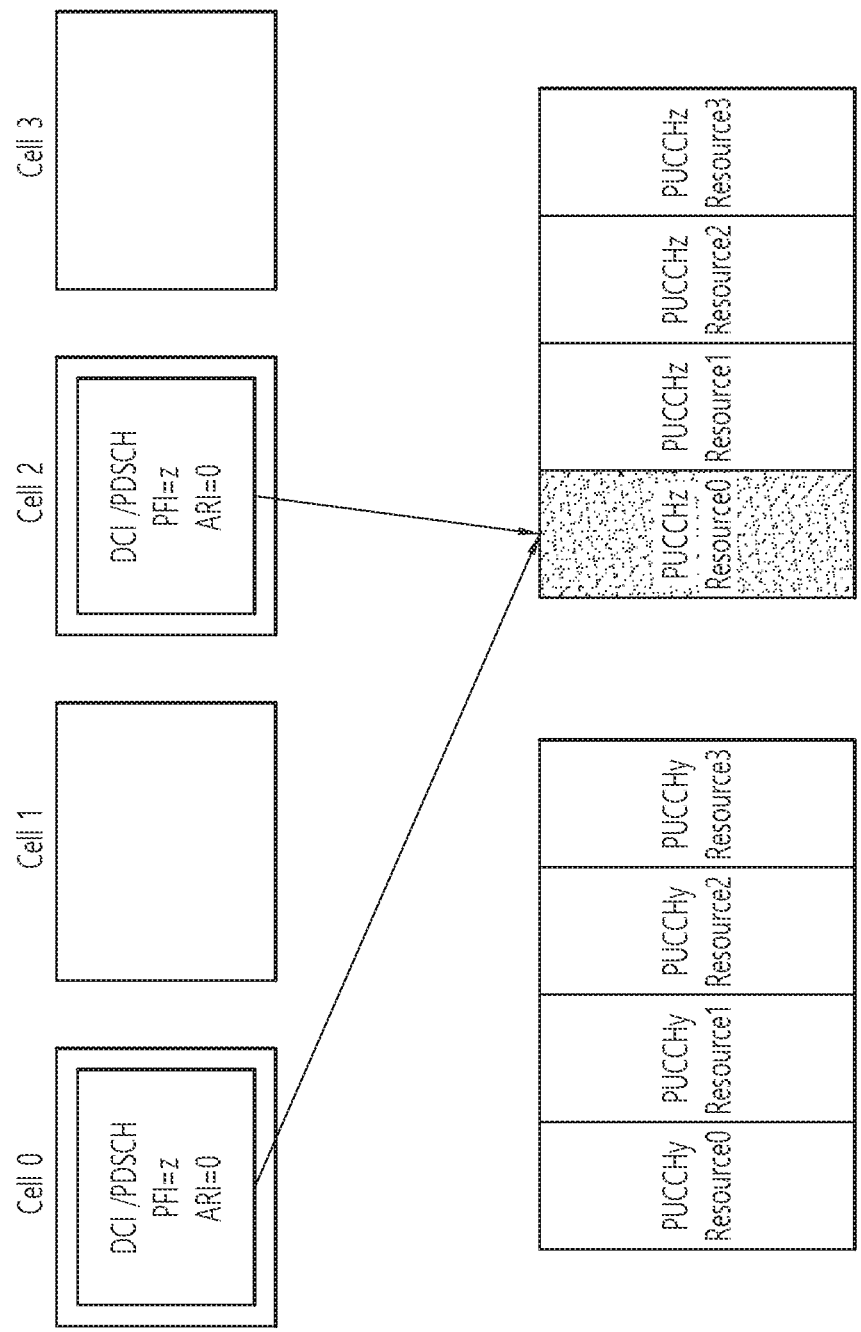
FIG. 10 shows another example of selecting a PUCCH format according to an embodiment of the present invention.

FIG. 10 shows another example of selecting a PUCCH format according to an embodiment of the present invention. It is shown herein that DCI of a cell 0 (PCell) has a PFI for designating PUCCHz, and DCI of a cell 2 (SCell) has a PFI for designating PUCCHz.

In order to designate the PUCCH format, bit extension or reinterpretation of an ARI is also possible, rather than an independent field such as the PFI. Alternatively, the PUCCH format may be reported through a search space, a scrambling sequence, a cyclic redundancy check (CRC) masking sequence, or the like in which the DCI is transmitted.

An ARI value may designate a combination of the PUCCH format and the PUCCH resource. For example, if a 2-bit ARI is reused, it may be expressed as follows.

TABLE 3

| ARI value | PUCCH resource |
|---|---|
| 00 | first PUCCH resource index of PUCCHy |
| 01 | second PUCCH resource index of PUCCHy |
| 10 | first PUCCH resource index of PUCCHz |
| 11 | second PUCCH resource index of PUCCHz |

When a plurality of selectable PUCCH formats include a plurality of PUCCH formats having different resource blocks, an ARI designates a different number of resource blocks to select a corresponding PUCCH format. For example, if there are a first PUCCHz having one resource block and a second PUCCHz having two resource blocks and if the ARI indicates two resource blocks, the second PUCCH format may be selected.

Figure 11:
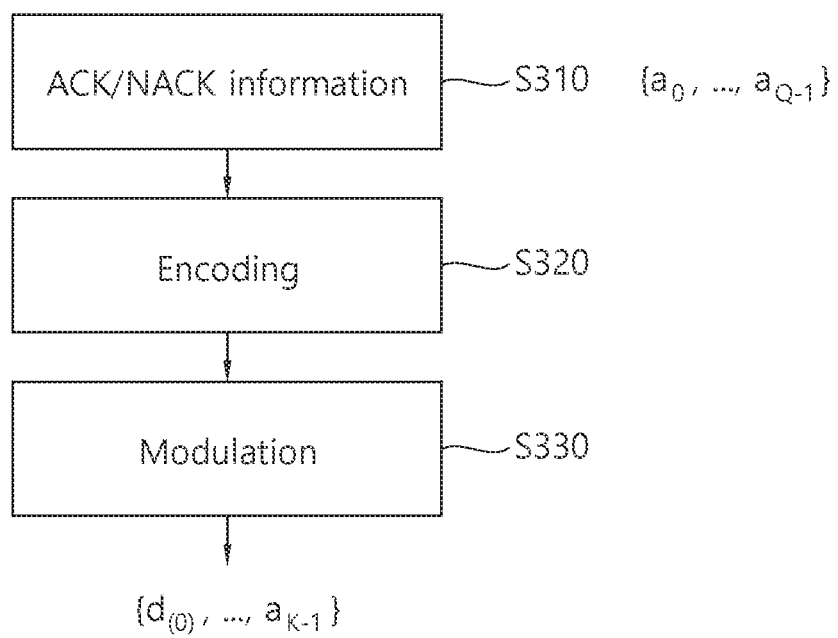
FIG. 11 shows processing of positive-acknowledgement (ACK)/negative-acknowledgement (NACK) information according to an embodiment of the present invention.

FIG. 11 shows processing of ACK/NACK information according to an embodiment of the present invention. This may be processing of ACK/NACK information applied to PUCCHz.

In step S310, it is assumed that the ACK/NACK information is a Q-bit sequence $\{a_0, \ldots, a_{Q-1}\}$. $a_q$ is an ACK/NACK bit. Q cannot exceed a maximum payload of the PUCCHz.

In step S320, an ACK/NACK information sequence is encoded according to a code rate. A well-known tail-biting convolutional code (TBCC) or the like may be applied as an encoding scheme.

In step S330, an encoded bit is modulated according to a modulation scheme to generate a plurality of data symbols $\{d_0, \ldots, d_K\}$.

To generate ACK/NACK information for a plurality of cells, the following terms are defined for convenience of explanation.

Mi: The number of DL subframes linked to transmit ACK/NACK through a corresponding UL subframe for a cell i.

Nc: The number of PDSCHs capable of transmitting an ACK/NACK feedback for a PUCCH format. Spatial bundling may or may not be applied. When a plurality of transport blocks are transmitted on one PDSCH, if one ACK/NACK bit corresponds to each transport block, it is said that the spatial bundling is not applied. When a plurality of transport blocks are transmitted on one PDSCH, if one ACK/NACK bit corresponds to the plurality of transport blocks, it is said that the spatial bundling is applied.

<If it is configured only with an FDD cell, or if a cell for transmitting a PUCCH is the FDD cell, or if Mi=1>

(1) ACK/NACK bits may be arranged in order of a 'c-DAI'. ACK/NACK information includes Nc ACK/NACK bits corresponding to a PDSCH with c-DAI<=Nc. The 'c-DAI' is described below.

(2) ACK/NACK bits may be arranged in order of a cell index. ACK/NACK information may include ACK/NACK bits for Nc cells in an ascending order of the cell index.

<If a cell satisfying Mi>1 is present>

(1) A wireless device alternately arranges an ACK/NACK bit corresponding to each cell in such a manner that ACK/NACK bits for a plurality of cells corresponding to one subframe are first arranged.

(1-1) The ACK/NACK bits may be arranged in order of a c-DAI. A cell having a small c-DAI value is selected preferentially for a determined PUCCH format, and ACK/NACK information includes at most Nc ACK/NACK bits corresponding to Mi subframes of each cell. If the wireless device misses reception of the c-DAI, the ACK/NACK information may be mismatched with respect to a BS. To avoid this, the ACK/NACK bit may be arranged by assuming a maximum value among values of Mi for all cells as Mi of each cell. A maximum c-DIA value capable of performing ACK/NACK transmission may be predetermined or may be calculated according to capacity Nc of each PUCCH format.

(1-2) The ACK/NACK bit may be arranged in an order pre-assigned for each PUCCH format. The ACK/NACK information may include at most Nc ACK/NACK bits corresponding to Mi subframes of each cell in an ascending order of the cell index.

In the method (1-1) or (1-2), if capacity of ACK/NACK information that can be transmitted with a corresponding PUCCH format is insufficient, ACK/NACK information of a last-order cell may be transmitted only for some subframes among Mi subframes.

(2) The wireless device first arranges ACK/NACK bits for a plurality of subframes corresponding to respective cells. A t-DAI is described below. For all serving cells or serving cells with Mi>1, the ACK/NACK information may be configured on the basis of an ACK/NACK bit corresponding to at most Msf subframes. Msf is a number determined for each PUCCH format. A method of selecting the Msf subframes may include selecting preferentially a temporally preceding subframe or selecting preferentially a subframe scheduled with a small t-DAI. If capacity of ACK/NACK information that can be transmitted with a corresponding PUCCH format is insufficient, it may be transmitted only for some subframes among the Msf subframes of the last-order cell.

(3) The wireless device may transmit preferentially the ACK/NACK bit corresponding to at most Msf subframes with respect to at most Mcell cells as ACK/NACK information. Msf and Mcell are numbers determined for each PUCCH format. A method of selecting the Msf subframes may include selecting preferentially a temporally preceding subframe or selecting preferentially a subframe scheduled with a small t-DAI.

When the ACK/NACK information cannot be transmitted through the determined PUCCH format, the wireless device may perform the following operation.

Since it may be determined that there is an error in reception of DCI for designating the PUCCH format, the entire ACK/NACK information is not transmitted. Only ACK/NACK may be transmitted for a specific cell (e.g., PCell) which does not require an indication of the PUCCH format through the DCI.

Only the remaining ACK/NACK information other than ACK/NACK for a corresponding PDSCH is transmitted by using the designated PUCCH format.

The ACK/NACK information is transmitted through compression of the number of ACK/NACK bits by using bundling (e.g., AND operation) or the like of the ACK/NACK bit. Whether to compress ACK/NACK may be reported through CRC masking of the ACK/NACK information together with a corresponding PUCCH format.

Since a subframe in which the PUCCH is to be transmitted is designated as a subframe for transmitting CSI, the PUCCH format may have to transmit the CSI together with ACK/NACK. This means that the number of ACK/NACK bits that can be transmitted is reduced. The following operation may be performed when the total number of bits of UCI to be transmitted with the PUCCH format is greater than the number of bits that can be transmitted with an indicated PUCCH format.

The wireless device determines that there is an error in DCI reception having a PFI, and thus does not transmit the entire ACK/NACK. Only ACK/NACK may be transmitted for a specific cell (e.g., PCell) which does not require an indication of the PUCCH format through the DCI.

If capacity of the PUCCH format is Nc bits and the number of bits for CSI is Ncsi, ACK/NACK information of (Nc-Ncsi) bits is transmitted together with the CSI. A cell for transmitting ACK/NACK information may be determined according to a cell index order.

The wireless device may abandon the CSI transmission and transmit only the ACK/NACK information. When a sum of the number of CSI bits and the number of ACK/NACK bits for all cells is less than or equal to the maximum number of information bits that can be transmitted with PUCCHz, ACK/NACK and CSI are both transmitted. If the sum exceeds the maximum number, CSI transmission may be abandoned and only ACK/NACK may be transmitted.

PUCCH Format Selection Based on Cell/Subframe in which PDSCH is Received

A wireless device may determine a PUCCH format to be used according to a range of a serving cell corresponding to an ACK/NACK feedback. The range of the serving cell and the PUCCH format to be applied may be predetermined or may be given through RRC signaling.

For example, assume that K serving cells are configured for the wireless device. PUCCHy may be used to feed back ACK/NACK for cells from a cell 0 to a cell L−1 (L<K), and PUCCHz may be used to feed back ACK/NACK for cells from a cell L to a cell K−1.

A BS may predetermine a plurality of candidate resources for the PUCCHy and a plurality of candidate resources for the PUCCHz through RRC signaling. In addition, which one will be used among the plurality of candidate resources may be designated through an ARI in DCI.

Specifically, assume that a cell group corresponding to both the PUCCHy and the PUCCHz is a cell group y, and a cell group corresponding to only the PUCCHz is a cell group z.

Figure 12:
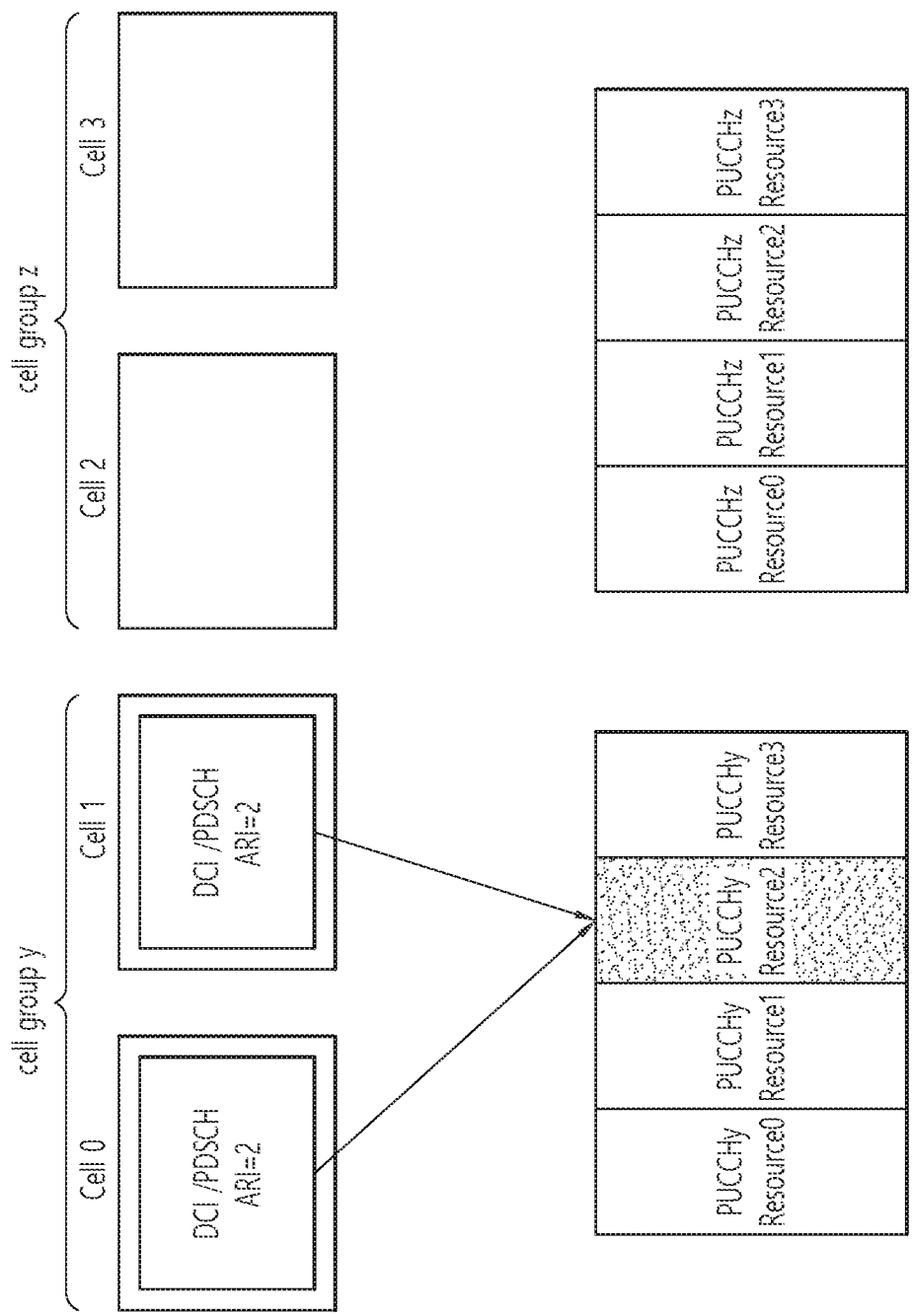
FIG. 12 shows an example of selecting a PUCCH format according to another embodiment of the present invention.

FIG. 12 shows an example of selecting a PUCCH format according to another embodiment of the present invention.

An ARI in DCI of a cell group y and an ARI in DCI of a cell group z both indicate the same value. A wireless device selects a resource indicated by the ARI among a plurality of candidate resources for a PUCCH format selected by the wireless device. Herein, since only DCI of a cell in cell group y is received, the wireless device selects PUCCHy.

Figure 13:
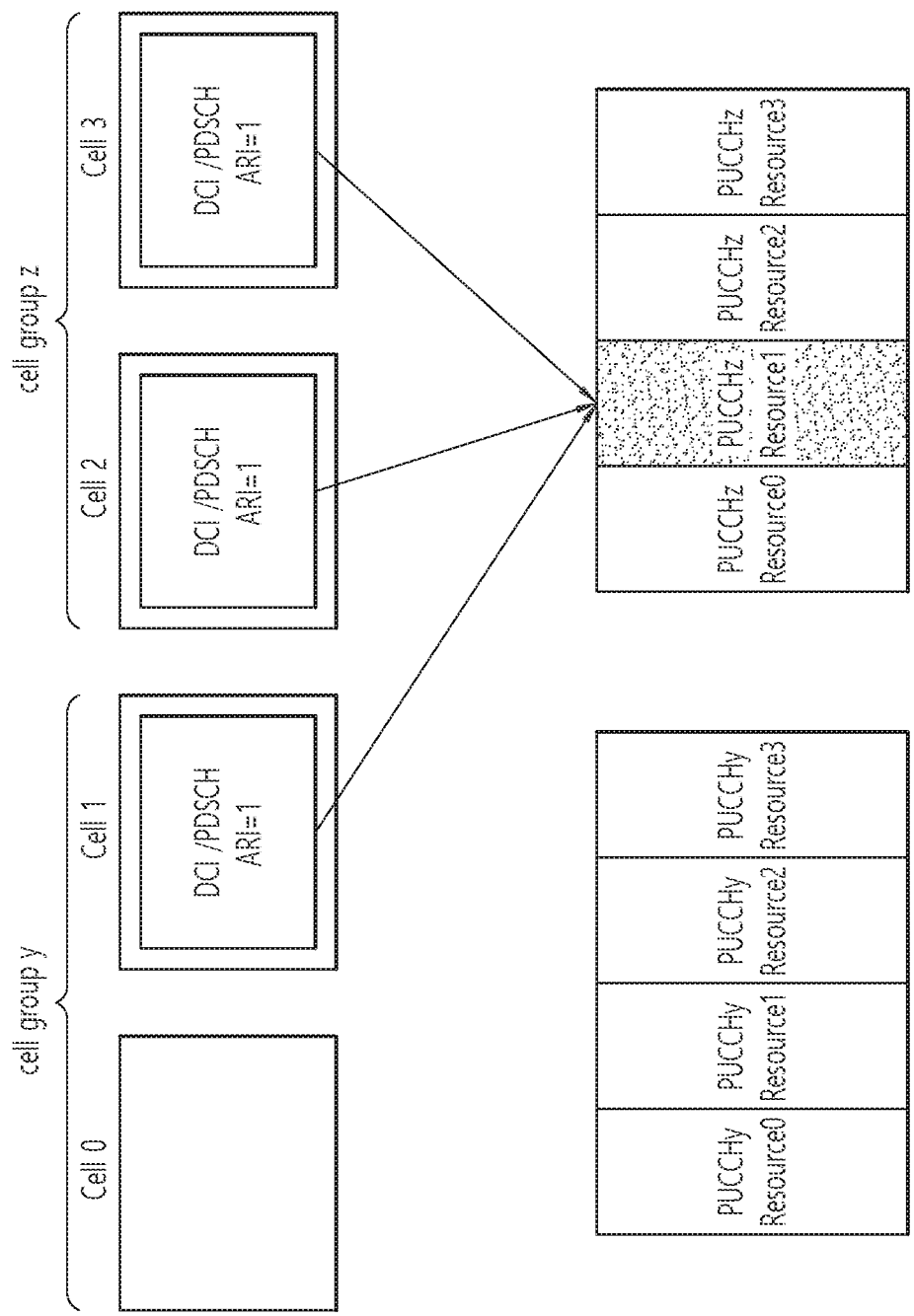
FIG. 13 shows another example of selecting a PUCCH format according to another embodiment of the present invention.

FIG. 13 shows another example of selecting a PUCCH format according to another embodiment of the present invention. In comparison with the example of FIG. 12, a wireless device receives DCI from a cell 1 of a cell group y and a cell 2/3 of a cell group z. Since the cell group z can use only PUCCHz, the wireless device selects the PUCCHz.

Figure 14:
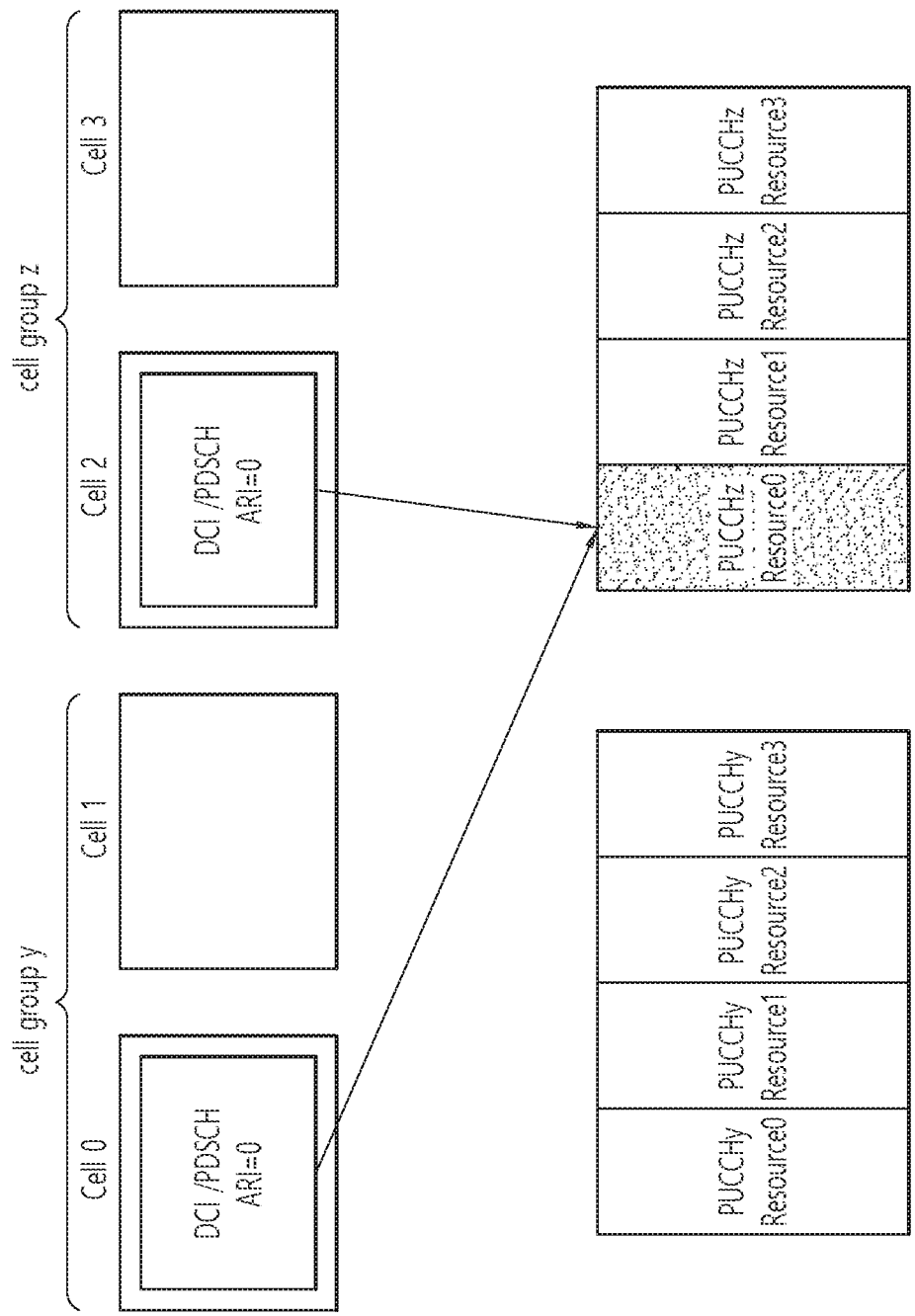
FIG. 14 shows another example of selecting a PUCCH format according to another embodiment of the present invention.

FIG. 14 shows another example of selecting a PUCCH format according to another embodiment of the present invention. In comparison with the example of FIG. 12, a wireless device receives DCI from a cell 0 of a cell group y and a cell 2 of a cell group z. Since the cell group z can use only PUCCHz, the wireless device selects the PUCCHz.

Figure 15:
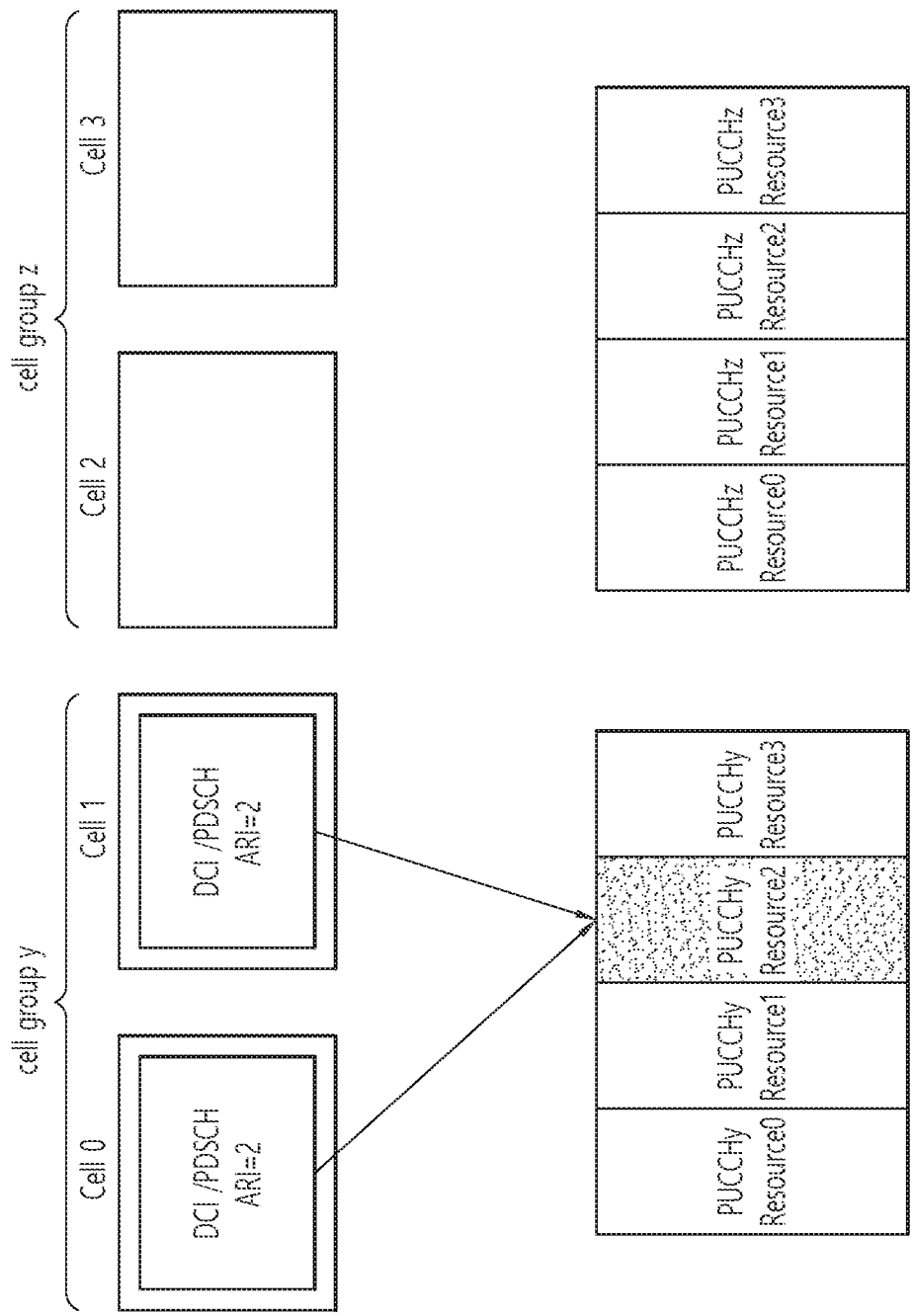
FIG. 15 shows an example of selecting a PUCCH format according to another embodiment of the present invention.

FIG. 15 shows an example of selecting a PUCCH format according to another embodiment of the present invention.

An ARI in DCI of a cell group y indicates a resource allocated to PUCCHy, and an ARI in DCI of a cell group z indicates a resource allocated to PUCCHz. Upon receiving the DCI of the cell group z, a wireless device ignores the ARI in the DCI of the cell group y, and selects a resource of the PUCCHz by using the ARI in the DCI of the cell group z. Herein, since only DCI of a cell in the cell group y is received, the wireless device selects PUCCHy.

Figure 16:
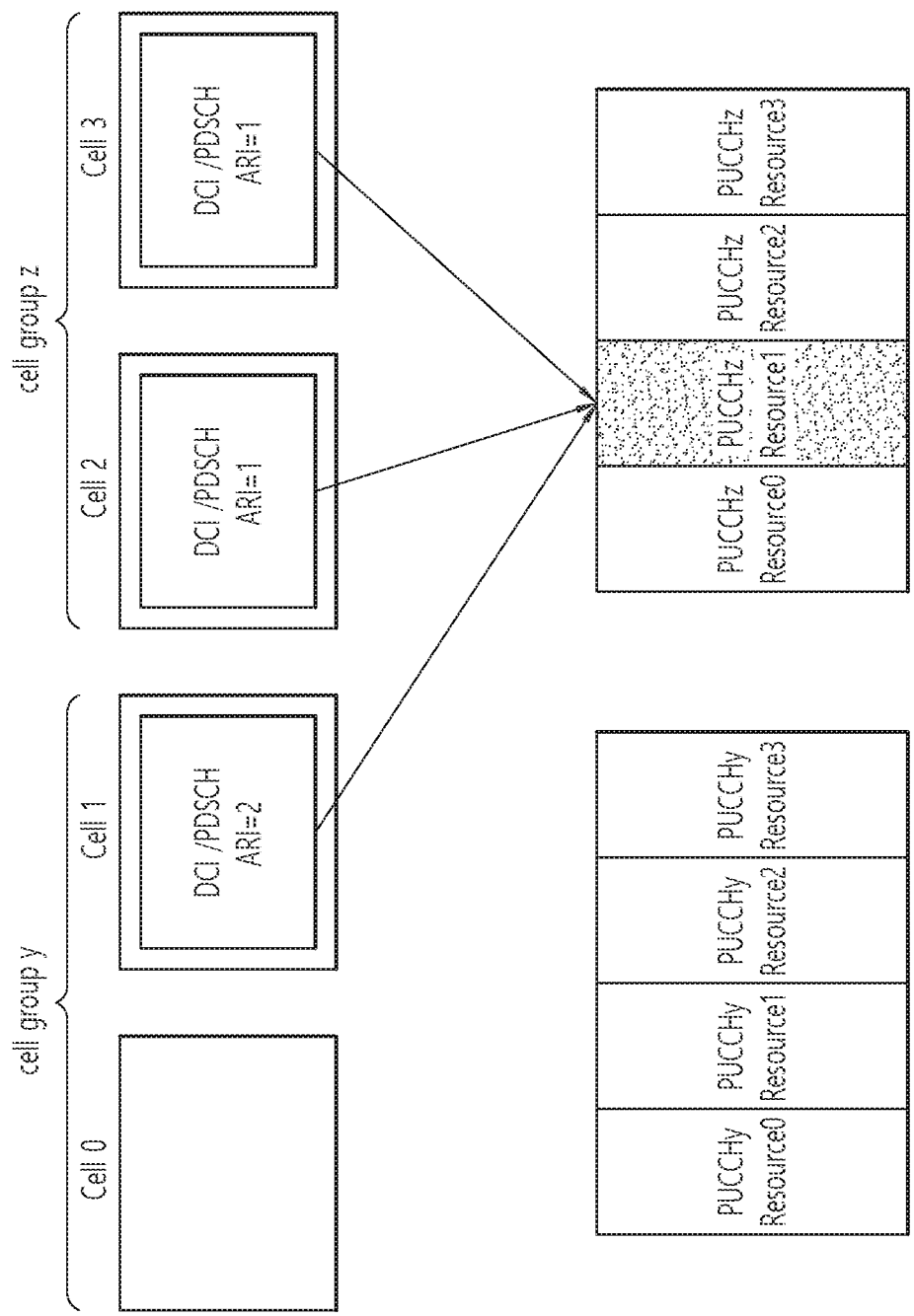
FIG. 16 shows another example of selecting a PUCCH format according to another embodiment of the present invention.

FIG. 16 shows another example of selecting a PUCCH format according to another embodiment of the present invention. In comparison with the example of FIG. 15, a wireless device receives DCI from a cell 1 of a cell group y and a cell 2/3 of a cell group z. An ARI of the cell group y is ignored, and a PUCCHz resource indicated by an ARI of a cell group z is selected.

Figure 17:
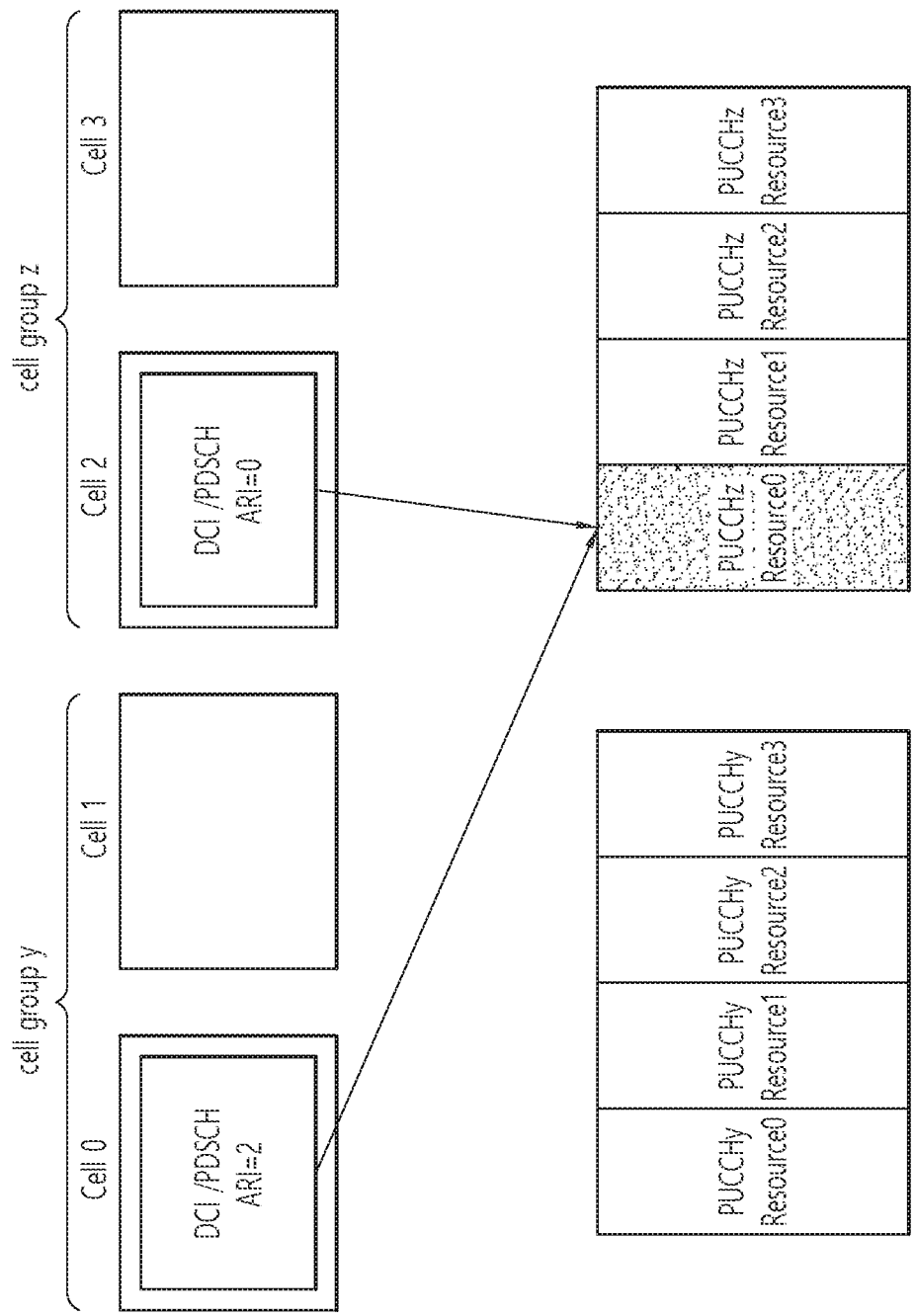
FIG. 17 shows another example of selecting a PUCCH format according to another embodiment of the present invention.

FIG. 17 shows another example of selecting a PUCCH format according to another embodiment of the present invention. In comparison with the example of FIG. 15, a wireless device receives DCI from a cell 0 of a cell group y and a cell 2 of a cell group z. An ARI of the cell 0 is ignored, and a PUCCHz resource indicated by an ARI of the cell 2 is selected.

In a case where PUCCHz uses a plurality of PUCCHy resources (e.g., a plurality of resource blocks are allocated to PUCCHz), a PUCCHy resource to be used for ACK/NACK transmission may be pre-designated for each cell group, and PUCCHz may be transmitted by using the PUCCHy resource.

When it is assumed that N PUCCHy resources can be used simultaneously for at most N cell groups, a PUCCH resource may be selected by using an ARI in the following manner.

Figure 18:
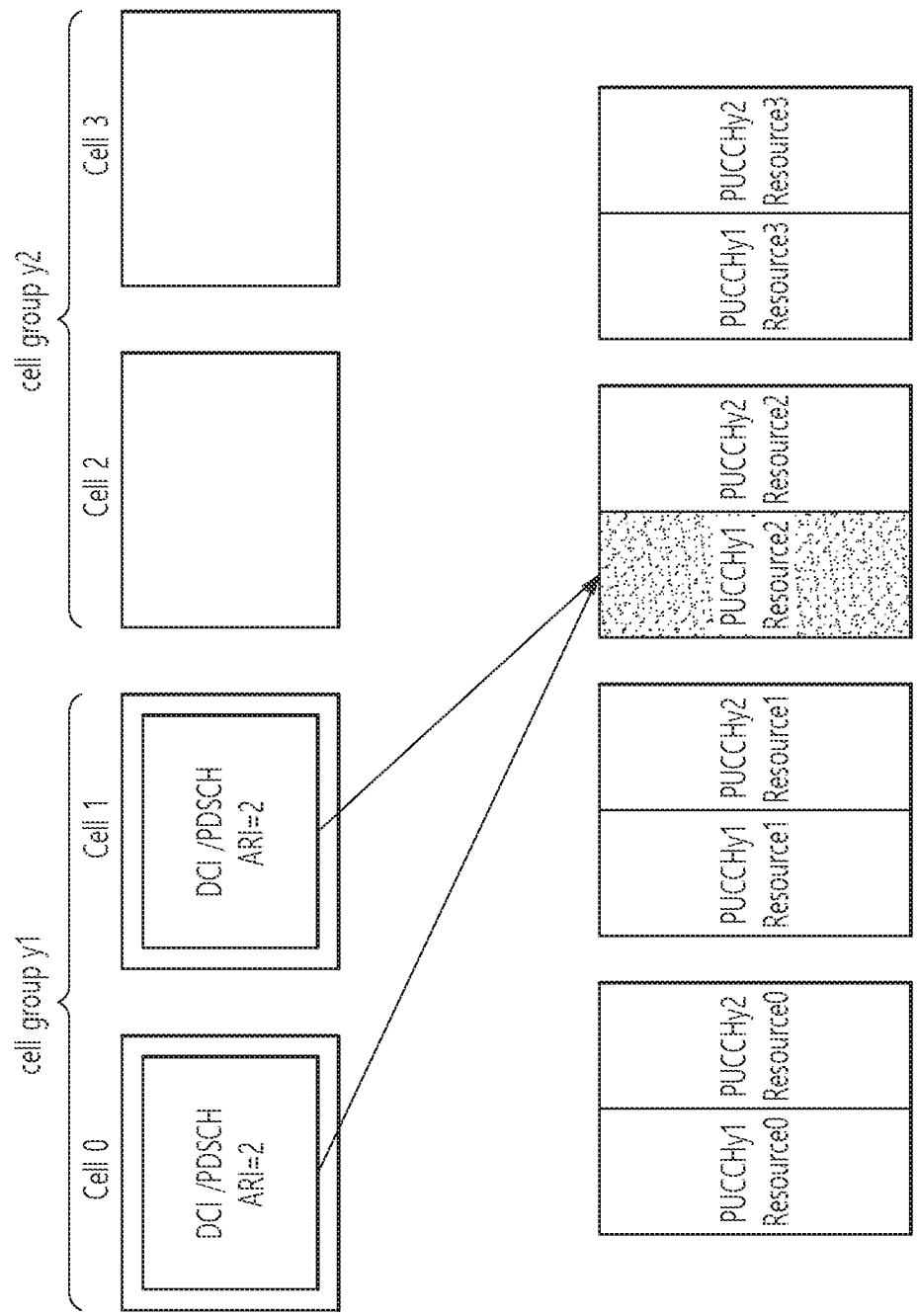
FIG. 18 shows an example of selecting a PUCCH format according to another embodiment of the present invention.

FIG. 18 shows an example of selecting a PUCCH format according to another embodiment of the present invention.

An ARI indicates one of combinations of N PUCCHy resources. An ARI value and a combination of N PUCCHy resources may be predetermined or may be configured by RRC signaling. ARIs of all cell groups indicate the same value, and a wireless device may transmit ACK/NACK by using only a necessary PUCCHy resource among combinations of PUCCHy resources indicated by the ARIs.

Herein, a PUCCH resource corresponding to a cell group y1 is called PUCCHy1, and a PUCCH resource corresponding to a cell group y2 is called PUCCHy2. A cell 0 and a cell 1 belong to the cell group y1, and ARI=2. Therefore, a third resource of the PUCCHy1 is selected.

Figure 19:
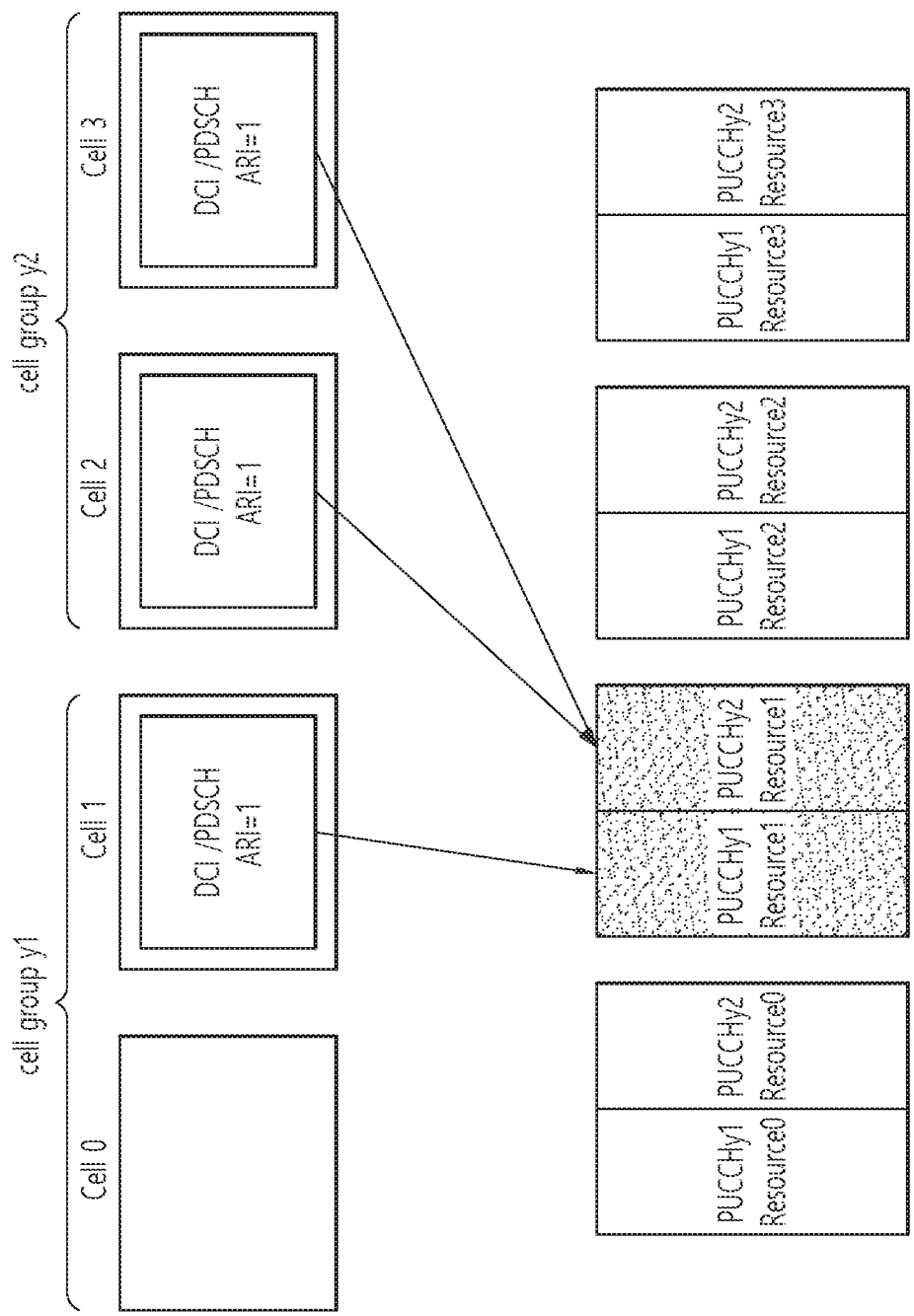
FIG. 19 shows another example of selecting a PUCCH format according to another embodiment of the present invention.

FIG. 19 shows another example of selecting a PUCCH format according to another embodiment of the present invention. In comparison with the example of FIG. 18, ARIs of a cell 1, a cell 2, and a cell 3 are all the same value. A second resource of PUCCHy1 is selected in the cell 1, and a second resource of PUCCHy2 is selected in the cell 2/3.

Figure 20:
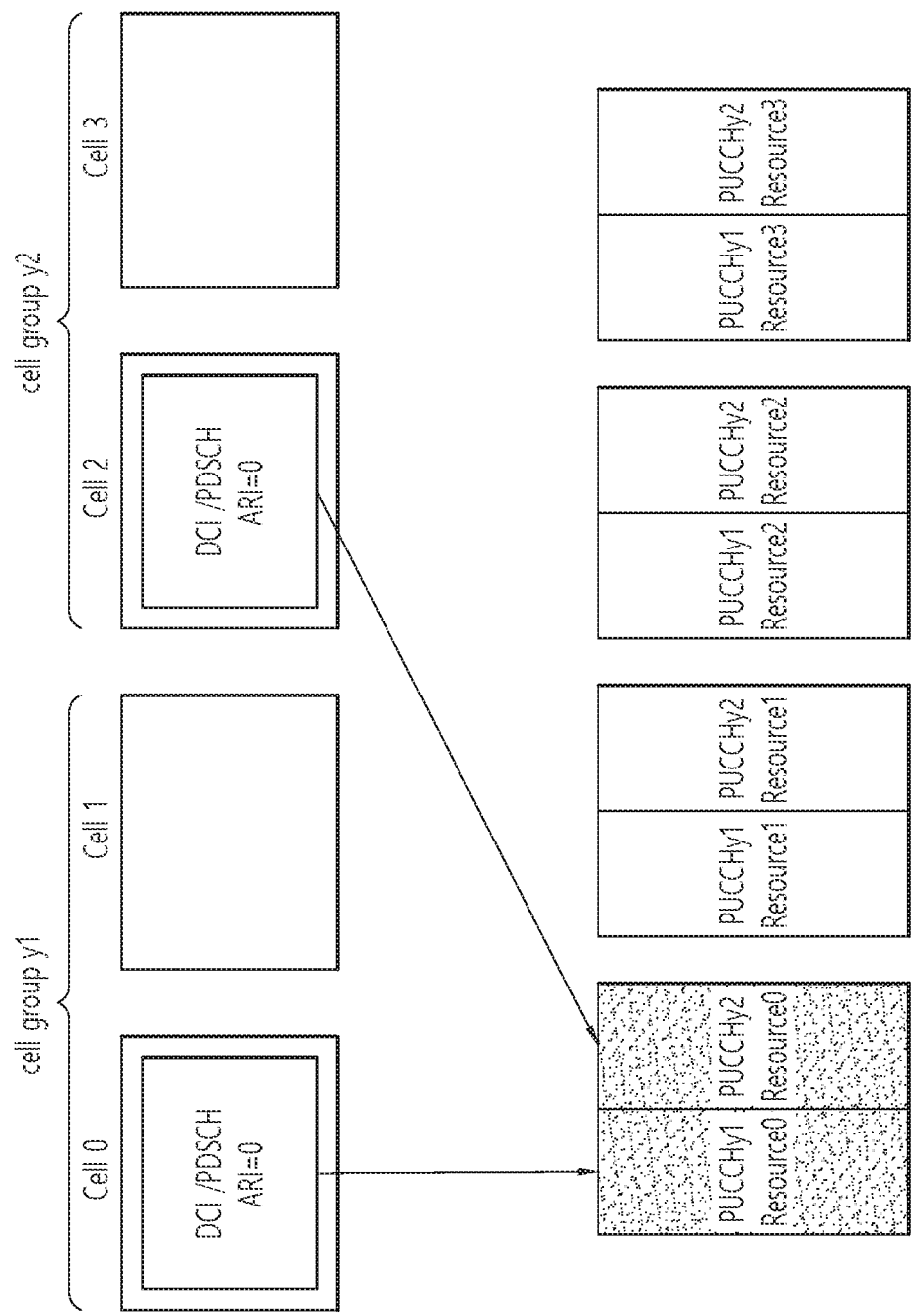
FIG. 20 shows another example of selecting a PUCCH format according to another embodiment of the present invention.

FIG. 20 shows another example of selecting a PUCCH format according to another embodiment of the present invention. In comparison with the example of FIG. 18, a first resource of PUCCHy1 is selected in a cell 0, and a first resource of PUCCHy2 is selected in a cell 2.

Figure 21:
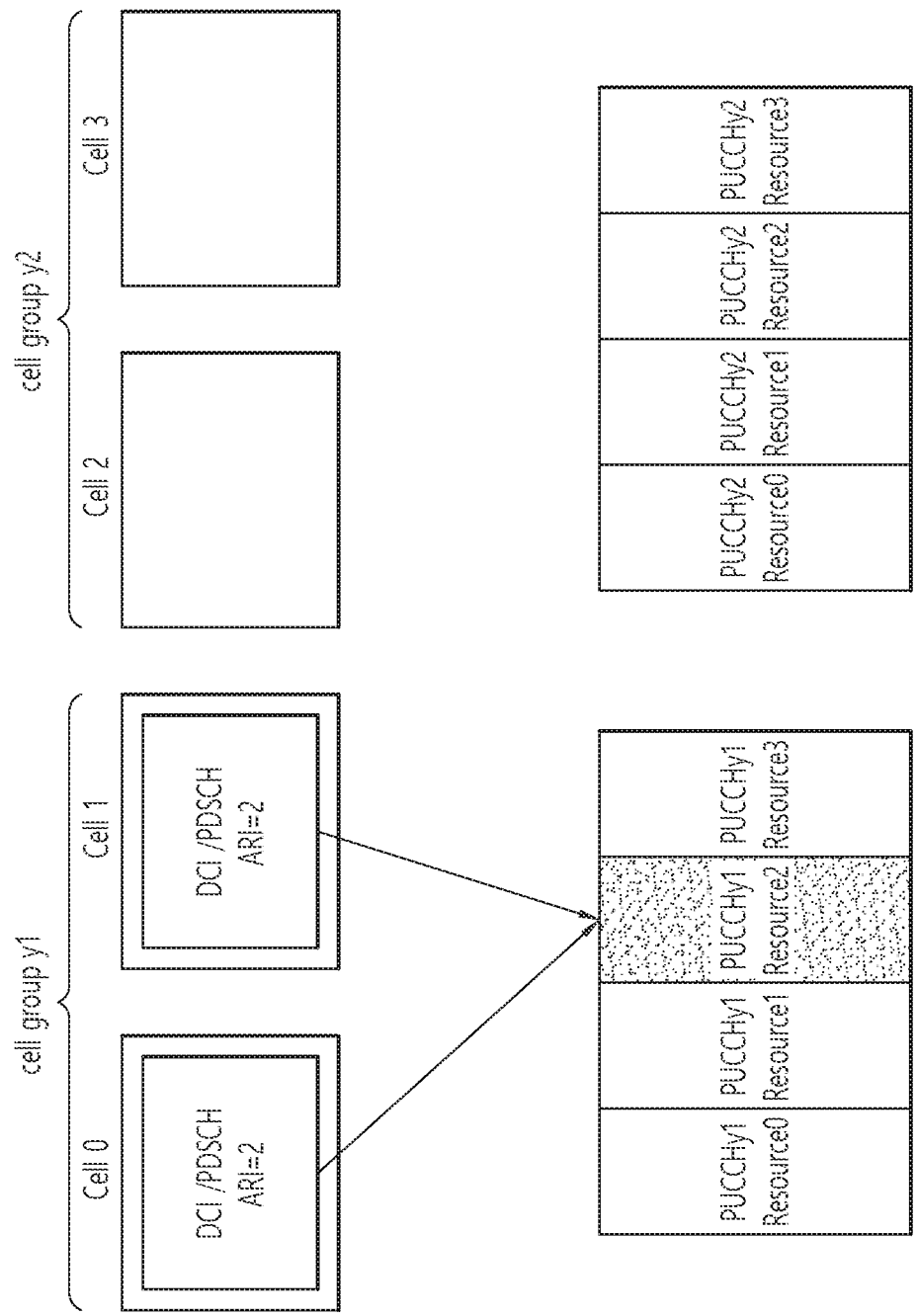
FIG. 21 shows an example of selecting a PUCCH format according to another embodiment of the present invention.

FIG. 21 shows an example of selecting a PUCCH format according to another embodiment of the present invention.

A plurality of available candidate PUCCHy resources are allocated to each cell group in advance through RRC signaling. An ARI of each cell group indicates one of a plurality of candidate PUCCHy resources of a corresponding cell group. ARIs of the same cell group are all set to the same value. A wireless device selects a PUCCHy resource designated by the ARI to transmit ACK/NACK.

Herein, a plurality of PUCCHy1 resources for a cell group y1 and a plurality of PUCCHy2 for a cell group y2 are predefined. A cell 0 and a cell 1 belong to the cell group y1, and ARI=2. Therefore, a third resource is selected among the plurality of PUCCHy1 resources.

Figure 22:
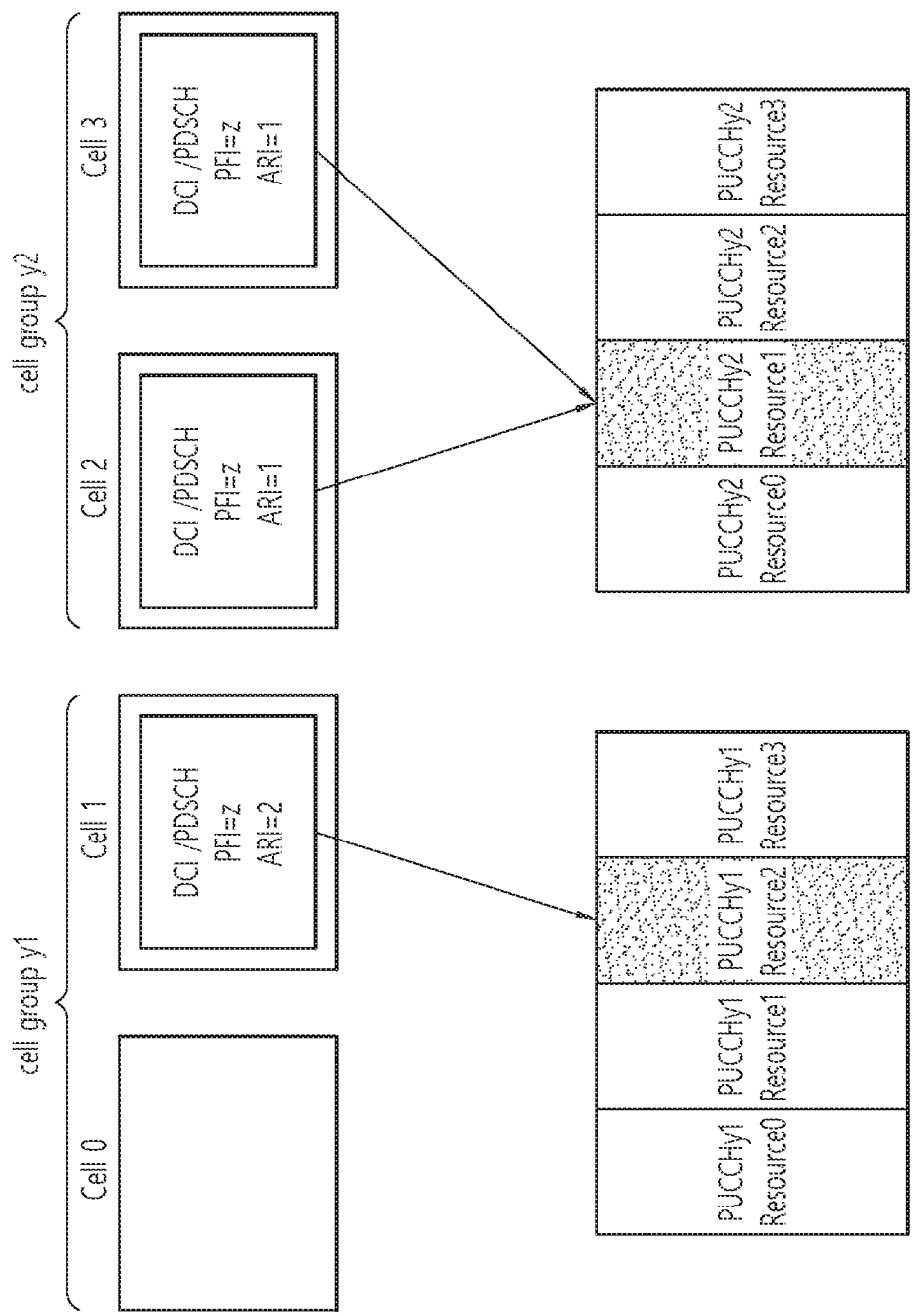
FIG. 22 shows another example of selecting a PUCCH format according to another embodiment of the present invention.

FIG. 22 shows another example of selecting a PUCCH format according to another embodiment of the present invention. In comparison with the example of FIG. 21, a third resource is selected among a plurality of PUCCHy1 resources in a cell 1 in a cell group y1, and a second resource is selected among a plurality of PUCCH2 resources in a cell 2/3 in a cell group y2.

Figure 23:
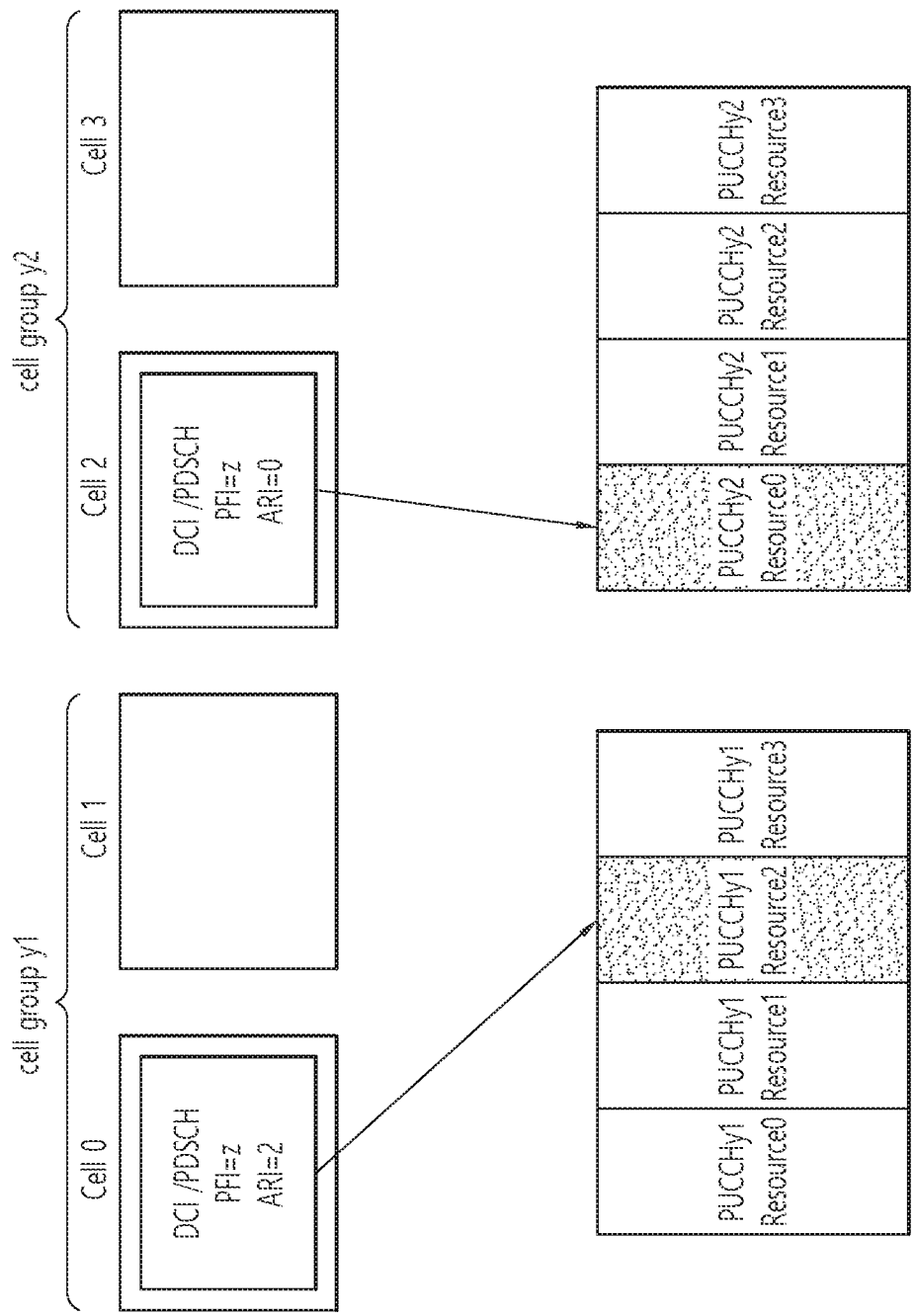
FIG. 23 shows another example of selecting a PUCCH format according to another embodiment of the present invention.

FIG. 23 shows another example of selecting a PUCCH format according to another embodiment of the present invention. In comparison with the example of FIG. 21, a third resource is selected among a plurality of PUCCHy1 resources in a cell 0 in a cell group y1, and a third resource is selected among a plurality of PUCCHy2 resources in a cell 2 in a cell group y.

If a PUCCH format is determined according to a cell/subframe in which a PUSCH is received, ACK/NACK information may be configured as follows.

<If it is configured only with an FDD cell, or if a cell for transmitting a PUCCH is the FDD cell, or if Mi=1>

ACK/NACK information may include an ACK/NACK bit arranged in an order pre-assigned for each PUCCH format. Mcell may be defined for each PUCCH format. If Cidmax denotes a maximum cell index of a cell in which a wireless device receives a PDSCH, a PUCCH format may be selected which is smaller than Cidmax+1 and corresponds to a smallest Mcell. For each PUCCH format, Mcell may be designated as Mcell=Nc.

The PUCCH format transmits ACK/NACK information corresponding to Mcell cells in an ascending order of a cell index or ACK/NACK information corresponding to Mcell cells in which Mi is not 0 in the ascending order of the cell index.

<If a cell satisfying Mi>1 is present>

(1) Cell unit transmission: The wireless device may select a PUCCH format on the basis of a PDSCH-scheduled cell or cell group.

ACK/NACK bits may be arranged in an order pre-assigned for each PUCCH format. Mcell may be defined for each PUCCH format. When Cidmax denotes a maximum cell index of a cell in which the wireless receives a PDSCH, a PUCCH format corresponding to a smallest value Nc where Mcell>=Cidmax may be selected. A Mcell value of the PUCCH format may be designated as a greatest value satisfying that a sum of values of Mi for all cells of which a cell index is less than or greater than Mcell or a sum of values of Mi for all cells of which a cell index is less than or greater than Mcell−1 is less than or equal to Nc.

The wireless device may select preferentially cells having a small cell index or cells of which Mi is not 0 among the cells having the small cell index, and may transmit an ACK/NACK bit corresponding to Mi subframes through a corresponding PUCCH format at most a maximum total sum Nc.

Figure 24:
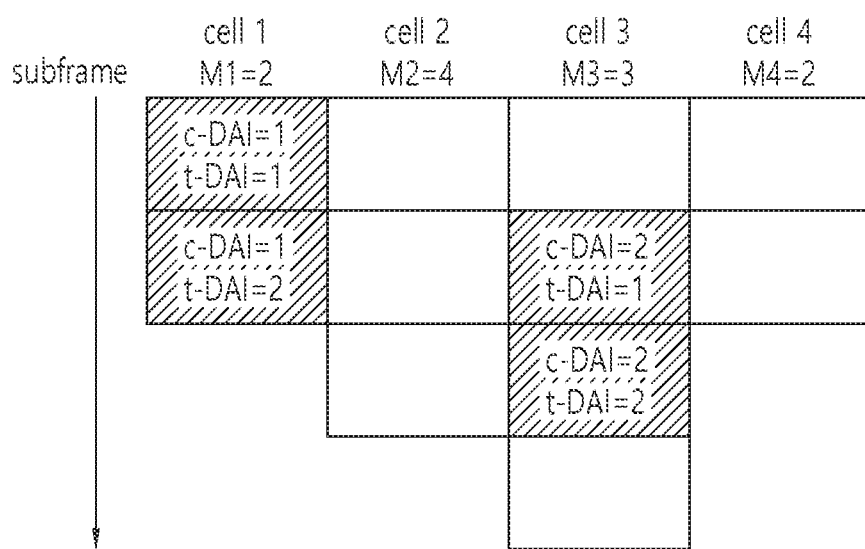
FIG. 24 shows an example of selecting a PUCCH format.

FIG. 24 shows an example of selecting a PUCCH format. Among indices of cells in which a wireless device receives a PDSCH, a maximum index is 3. The wireless device selects a PUCCH format having a smallest value Nc greater than or equal to M1+M2+M3=9.

If a size of ACK/NACK information exceeds capacity of the PUCCH format, ACK/NACK information of a last-order cell may be transmitted only in some of Mi subframes.

(2) Cell-subframe combination unit transmission: The wireless device may select a PUCCH format based on a combination of <PDSCH-scheduled cell or cell group> and <PDSCH-scheduled subframe or t-DAI>.

ACK/NACK bits may be arranged in an order pre-assigned for each PUCCH format. Mcell and Msf may be defined for each PUCCH format. Assume that Cidmax denotes a maximum cell index of a cell in which a PDSCH is received by a wireless device, t-DAImax denotes a maximum value among values of t-DAI received by the wireless device. A PUCCH format having a smallest Nc may be selected when the Mcell value is greater than or equal to Cidmax, and the Msf value is greater than or equal to t-DAImax. Mcell and Msf may be defined in the range of Mcell*Msf<=Nc.

A UE may select preferentially a subframe corresponding to a small t-DAI as a subframe for transmitting ACK/NACK for each cell. Alternatively, a cell having a smallest cell index may be selected preferentially.

Figure 25:
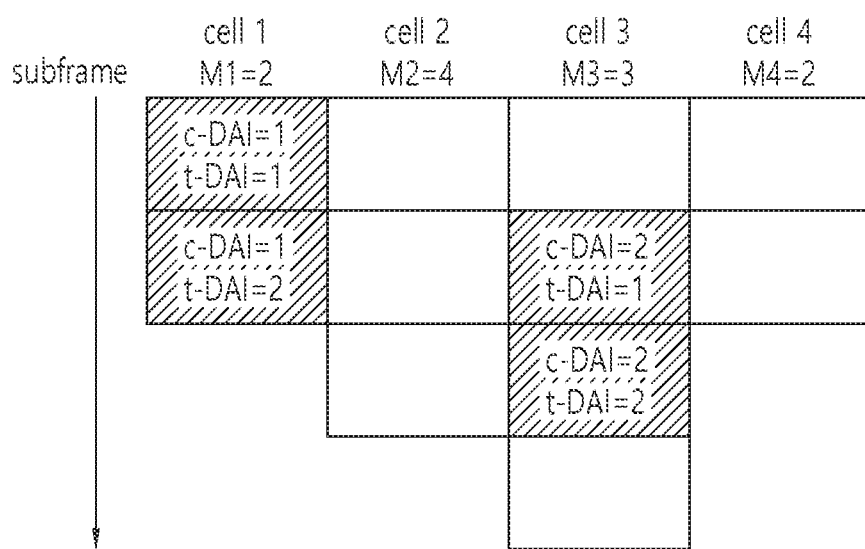
FIG. 25 shows an example of selecting a PUCCH format.

FIG. 25 shows an example of selecting a PUCCH format. A maximum cell index of a cell in which a wireless device receives a PDSCH is 3. Since a maximum t-DAI value is 2, a PUCCH format corresponding to a smallest Nc value may be selected while supporting Mcell>=3 and Msf>=2.

In the aforementioned embodiment, the PUCCH format may be selected according to an activated cell. The ACK/NACK information may include only an ACK/NACK bit for the activated cell. An ARI may be used only to determine validity of DCI having the ARI.

In the aforementioned embodiment, Nc, Mmax, and Cidmax may be calculated or excluded from a criterion for selecting the PUCCH format under the assumption that a first subframe of a specific cell is always transmitted exceptionally in a UCI payload configuration for the PUCCH. An ACK/NACK bit corresponding to the first subframe of the specific cell may be always arranged at a fixed position in the ACK/NACK information.

The ARI may indicate a PUCCH format and/or a PUCCH resource to transmit the ACK/NACK information. The ARI may indicate the number of bits of ACK/NACK information and/or whether to perform bundling on ACK/NACK. A different ARI may indicate a combination of the same PUCCHz resources and the number of bits of different ACK/NACK information, or may indicate a combination of different PUCCHz resources and the number of bits of different ACK/NACK information.

Figure 26:
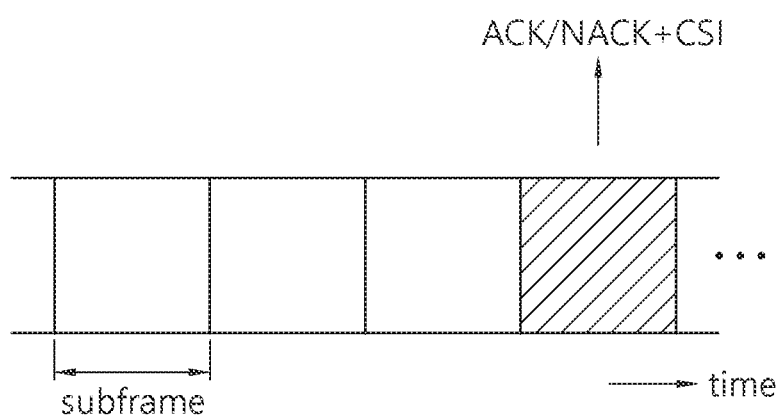
FIG. 26 shows uplink control information (UCI) transmission according to an embodiment of the present invention.

FIG. 26 shows UCI transmission according to an embodiment of the present invention.

CSI transmission may be triggered in a subframe in which ACK/NACK information is to be transmitted. The CSI transmission may be triggered through a periodic CSI report or a DCI-based indication.

If the PUCCH format transmits both the ACK/NACK information and the CSI, the PUCCH format may be determined by considering a CSI payload size.

For example, assume that PUCCHy may be used to transmit L ACK/NACK bits, or ACK/NACK bits corresponding to L cells, and PUCCHz may be used to transmit more than L ACK/NACK bits. Also, assume that a CSI payload size is n bits. Then, in a subframe in which the CSI and the ACK/NACK information are transmitted, the PUCCH format may be selected on the basis of ACK/NACK bits of up to L-n bits and/or ACK/NACKA bits exceeding the L-n bits.

If PUCCHz is selected, CSI transmission may be abandoned and only the ACK/NACK information may be transmitted.

If a sum of the number of ACK/NACK bits for all cells and the number of CSI bits is less than or equal to the maximum number of information bits that can be transmitted on PUCCHz, then both the ACK/NACK and the CSI may be transmitted through the PUCCHz. If the sum exceeds the maximum value, CSI transmission may be abandoned and only the ACK/NACK may be transmitted.

Arrangement of ACK/NACK Information

A method of configuring a bit sequence $\{a_0, \ldots a_{Q-1}\}$ of ACK/NACK information transmitted through a PUCCH is described. The bit sequence may be an input bit-stream of channel coding for the ACK/NACK information.

(Method 1) A wireless device arranges an ACK/NACK bit preferentially (e.g., from a most significant bit (MSB)) for a cell in which a PDSCH is received in the ACK/NACK information.

An order of the ACK/NACK bits may conform to a predetermined rule (e.g., a cell index order). However, the arranging of the ACK/NACK bits through the predetermined rule may result in a mismatch of the ACK/NACK bit arrangement between a wireless device and a BS when the wireless device misses a presence of a scheduled PDSCH in a specific cell. Therefore, a DL assignment index (DAI) may be included in DCI having a DL grant for scheduling the PDSCH.

The DAI may be divided into two types, i.e., a cell-DAI (c-DAI) and a time-DAI (t-DAI). The c-DAI may have a successively increasing value for PDSCHs scheduled for different cells in the same subframe. Alternatively, the c-DAI may have a successively increasing value for PDSCHs scheduled for different cells in different subframes. The t-DAI may have a value which increases for each subframe in which the PDSCH is scheduled for each cell.

The wireless device may arrange ACK/NACK bits in an order of the DAI value in the ACK/NACK information. If DCI having a DAI value smaller than a received maximum DAI value is not received, it is regarded that reception of the DCI corresponding to the missing DAI value has failed, and it may be processed that the ACK/NACK bit is NACK or DTX (a state indicating that PDSCH reception has not been achieved). For example, assume that the received DAI values is {0, 1, 3, 4}. The wireless device may regards that reception of the DCI corresponding to DAI=2 has failed, and thus may process an ACK/NACK bit corresponding to DAI=2 as NACK or DTX.

The ACK/NACK bit corresponding to the received maximum DAI value may be processed as NACK or DTX.

Assume that the PUCCH format is designated by the DCI. If a size of the ACK/NACK information determined based on the maximum DAI value received (or received PDSCH) is greater than a size of a payload of the designated PUCCH format, only information capable of being transmitted through the PUCCH format may be transmitted according to a determined ACK/NACK bit order. For example, if the size of the payload of the designated PUCCH format is 72 bits and the size of the ACK/NACK information obtained from the maximum DAI is 80 bits, only 72 bits out of 80 bits of ACK/NACK information may be transmitted through the PUCCH format.

Since reception of the DCI including the PUCCH format indication may be in an unstable state, the wireless device may not transmit the entire ACK/NACK information. Upon receiving a PDSCH for a PCell, only ACK/NACK information for the PDSCH may be transmitted through the PUCCH. The wireless device may operate under the assumption that it has not received a corresponding PDSCH/PDCCH or all PDSCHs/PDCCHs (a PDSCH/PDCCH for the PCell may be excluded) received in a corresponding subframe. Specifically, PDSCH decoding may not be performed, or PDSCH data may not be stored in a DL HARQ buffer.

It may be adjusted that a cell having a specific feature has a low priority. For example, for an unlicensed cell operating in an unlicensed band which cannot be used exclusively in an LTE system, a DAI value is allowed to have a low priority so that an ACK/NACK bit of the unlicensed cell is arranged to be closed to a least significant bit (LSB).

Figure 27:
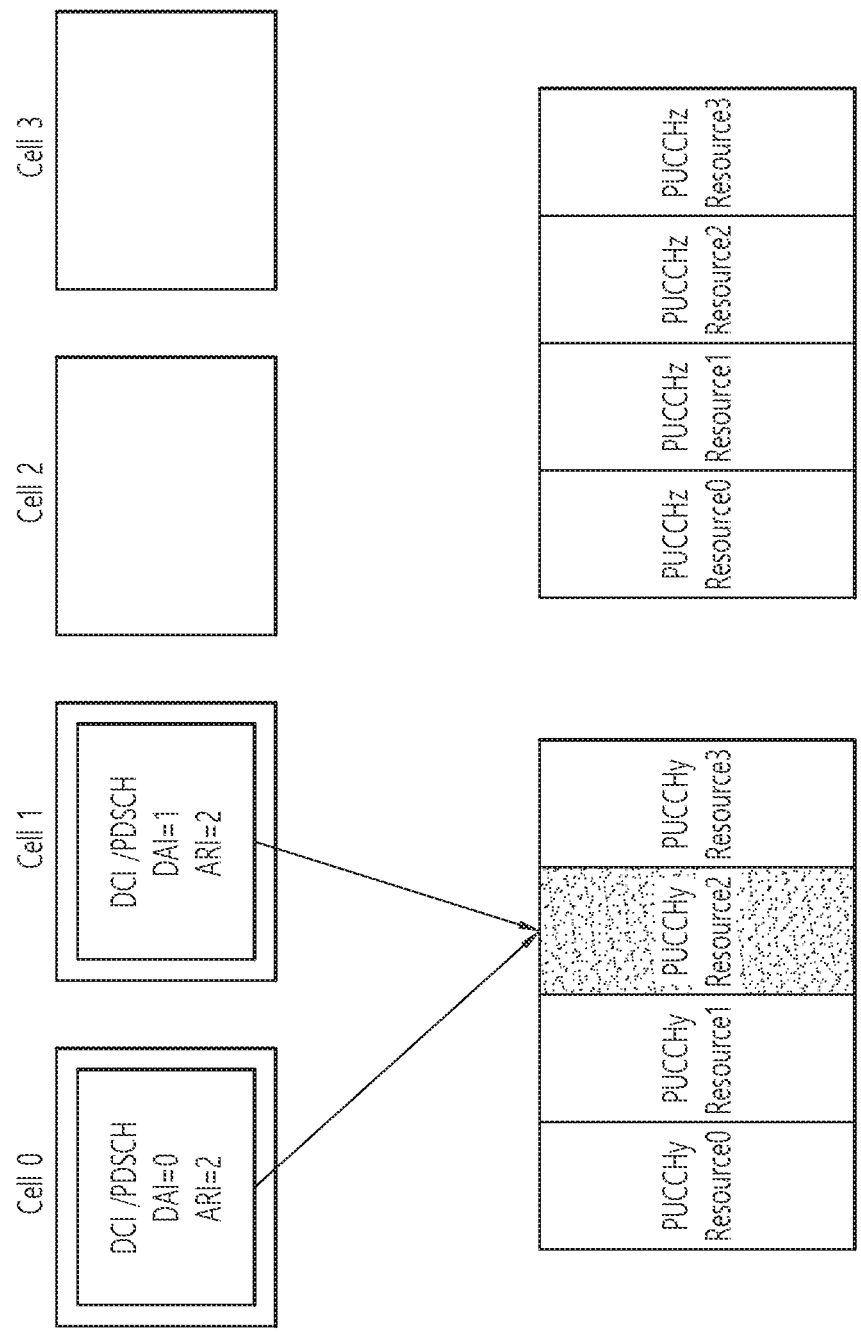
FIG. 27 shows an example of selecting a PUCCH according to an embodiment of the present invention.

FIG. 27 shows an example of selecting a PUCCH according to an embodiment of the present invention.

An ARI may indicate a PUCCH resource for another PUCCH format depending on a range of a DAI. For example, assume that PUCCHy is used if the number of cells in which a PDSCH is received is less than or equal to L, and PUCCHz is used if it exceeds L. An ARI of DCI having a DAI value in the range of 0 to (L-1) may indicate a PUCCHy resource, and an ARI of DCI having a DAI value greater than or equal to L may indicate a PUCCHz resource. The PUCCHy may be used to transmit ACK/NACK information for a PDSCH corresponding to the DAI value in the range of 0 to (L-1), and the PUCCHz may be used to transmit ACK/NACK information for PDSCHs of all cells. Upon receiving the DCI having the DAI value greater than or equal to L, the wireless device may ignore an ARI of DCI having a DAI value less than L.

In the example of FIG. 27, assume that PUCCHy is linked to a DAI value in the range of 0 to 1, and the PUCCHz is linked to a DAI value in the range of 2 to 3. Since a DAI of a cell 0 is 0 and a DAI of a cell 1 is 1, the PUCCHy is selected. An ARI of corresponding DCI designates a PUCCHy resource.

Figure 28:
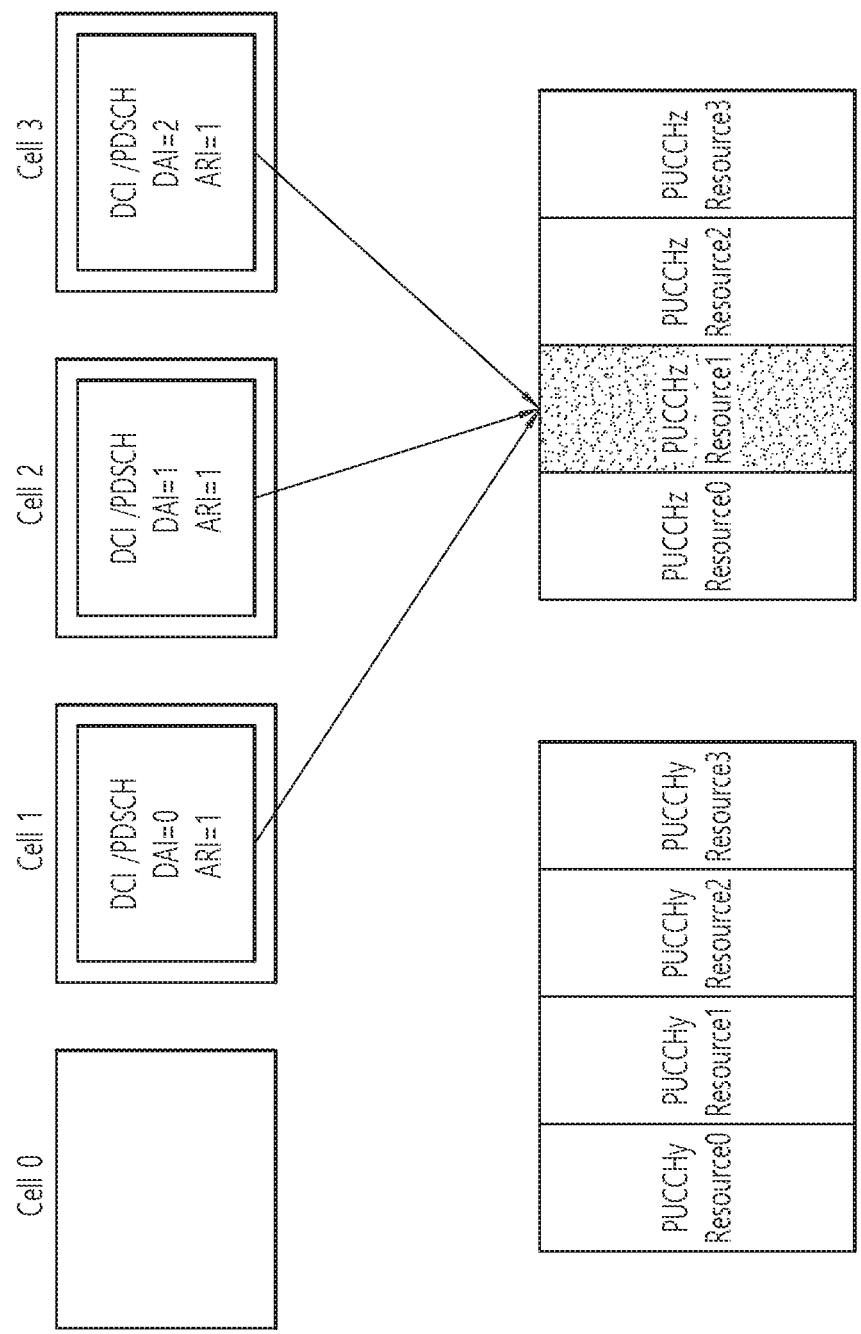
FIG. 28 shows another example of selecting a PUCCH according to an embodiment of the present invention.

FIG. 28 shows another example of selecting a PUCCH according to an embodiment of the present invention. Since there are two or more DAIS, PUCCHz is selected by ignoring the DAIS when the number of DAIS is less than 2.

Figure 29:
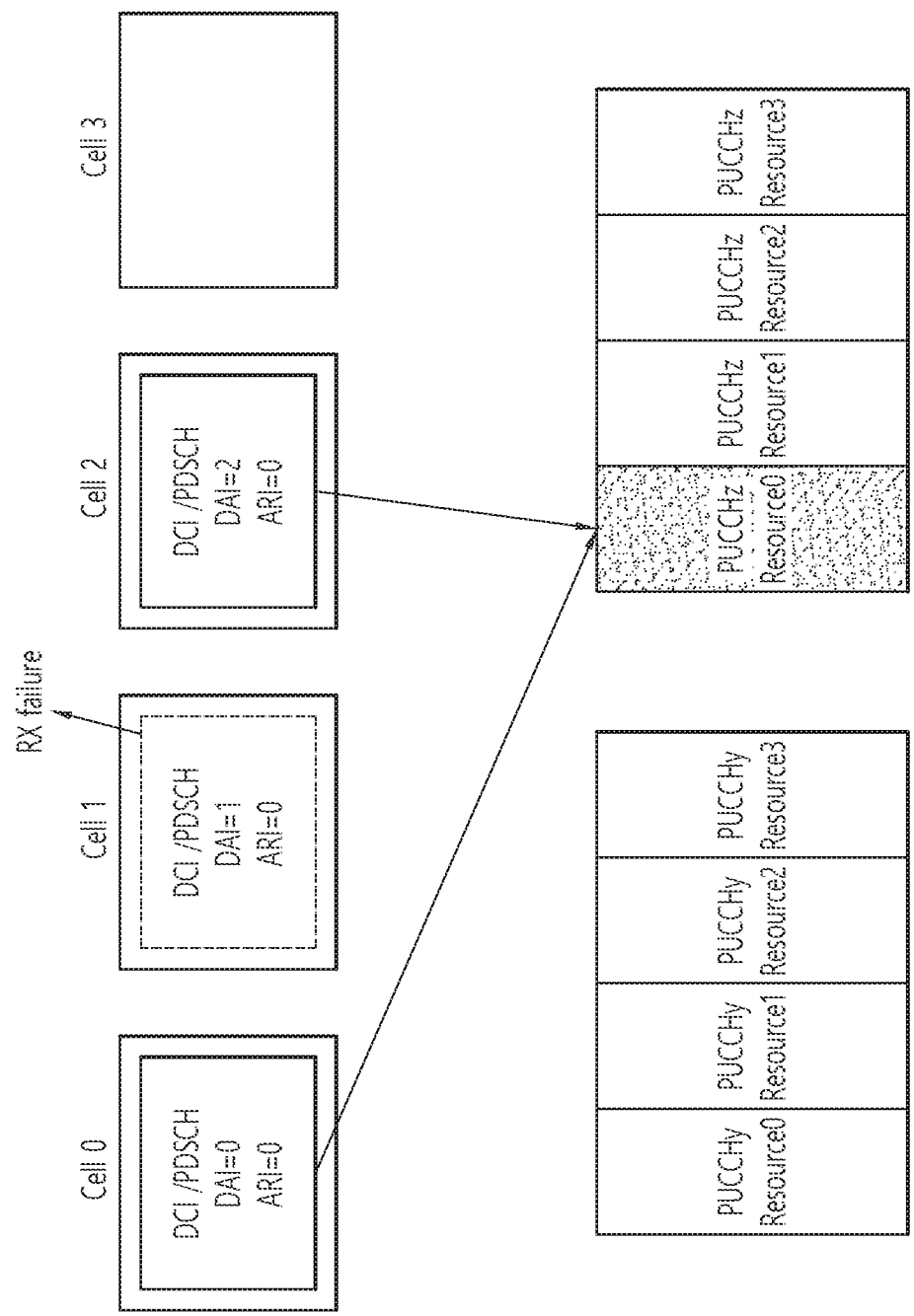
FIG. 29 shows another example of selecting a PUCCH according to an embodiment of the present invention.

FIG. 29 shows another example of selecting a PUCCH according to an embodiment of the present invention. This is a case where reception of DCI of a cell 1 has failed. Since there are two or more DAIS, PUCCHz is selected by ignoring the DAIS when the number of DAIS is less than 2.

In addition, when a plurality of resource blocks are allocated to the PUCCHz, the number of allocated resource blocks may be determined according to the range of the received DAI value.

(Method 2) ACK/NACK bits for a plurality of serving cells are arranged at predetermined positions.

A wireless device arranges ACK/NACK bits of a configured cell at a position pre-assigned in each PUCCH format. The configured cell may include only an activated cell, or may include an inactivated cell other than the activated cell.

For example, ACK/NACK bits corresponding to cells having a lowest cell index among all configured cells may be arranged in the PUCCHy, and ACK/NACK bits for all configured cells may be arranged in the PUCCHz.

Assume that the PUCCH format is designated by the DCI. Upon receiving a PDSCH of a cell in which the arrangement of the ACK/NACK bit is not designated, the wireless device may not transmit the ACK/NACK bit corresponding to the PDSCH.

Since reception of the DCI including the PUCCH format indication may be in an unstable state, the wireless device may not transmit the entire ACK/NACK information. Upon receiving a PDSCH for a PCell, only ACK/NACK information for the PDSCH may be transmitted through the PUCCH. The wireless device may operate under the assumption that it has not received a corresponding PDSCH/PDCCH or all PDSCHs/PDCCHs (a PDSCH/PDCCH for the PCell may be excluded) received in a corresponding subframe. Specifically, PDSCH decoding may not be performed, or PDSCH data may not be stored in a DL HARQ buffer.

(Method 3) ACK/NACK compression is applicable according to the PUCCH format.

If the PUCCH format is designated through DCI, the wireless device may transmit ACK/NACK information for all cells configured in the designated PUCCH format. Spatial bundling based on a logical-AND operation may be applied to a plurality of ACK/NACK bits for a plurality of transport blocks received from each cell. Bundling based on the logical-AND operation may be applied to a plurality of ACK/NACK bits for a plurality of transport blocks received in a plurality of subframes. When bundling is applied, the number of ACK/NACK bits to be transmitted may be decreased. ACK/NACK to which bundling is applied is called bundled ACK/NACK.

If a payload size differs for each PUCCH format, whether to apply bundling may be determined according to the payload size. For example, if PUCCHy is selected, the bundled ACK/NACK may be transmitted for a part of the entire cell (or entire DAI). If PUCCHz is selected, bundling may not be applied to the entire cell (or entire DAI). If there are not many cells to be actually scheduled in comparison with the total number of cells, a PUCCH format having a small payload size may be utilized to effectively use a PUCCH resource.

If the PUCCH format has a payload size which differs depending on the PUCCH resource, whether to apply bundling may be determined depending on the payload size. For example, if a PUCCHz resource 0 is selected, bundled ACK/NACK may be transmitted for a part of the entire cell (or entire DAI). If a PUCCHz resource 1 is selected, bundling may not be applied to the entire cell (or entire DAI). If there are not many cells to be actually scheduled in comparison with the total number of cells, a code rate of ACK/NACK information may be decreased to improve ACK/NACK transmission performance.

Meanwhile, when the number of ACK/NACK bits to be transmitted in one UL subframe is determined according to the number of DL subframes associated with the UL subframe as in the TDD system, the selection of the PUCCH format according to the aforementioned embodiment may be configured selectively for each subframe. It is considered that a subframe X is configured to transmit ACK/NACK bits corresponding to X or more DL subframes and a subframe Y is configured to transmit Y or more maximum ACK/NACK bits. The subframe X and/or the subframe Y may be a subframe to which PUCCH selection is applied. A PUCCHy resource and a PUCCHz resource may be allocated in the subframe X and/or the subframe Y, and PUCCHy or PUCCHz may be selected according to a size of ACK/NACK information or an indication of DCI. In the other subframes, ACK/NACK may be transmitted through PUCCHx or PUCCHy or PUCCHz without the selection of the PUCCH format.

An ARI of the DCI corresponding to the ACK/NACK transmitted in the subframe to which the PUCCH selection is applied may designate which one will be used among a plurality of candidate PUCCH resources. The number of bits of the ARI of the DCI corresponding to the ACK/NACK transmitted in the subframe to which the PUCCH selection is applied may be equal to or greater than the number of bits of an ARI of DCI corresponding to ACK/NACK transmitted in a subframe to which the PUCCH selection is not applied.

A first ARI of DCI corresponding to a subframe for selecting one of PUCCHy and PUCCHz may designate M+N states. M denotes the number of configured PUCCHy resources, and N denotes the number of configured PUCCHz resources. A second ARI of DCI corresponding to a subframe not supporting PUCCHz has the same number of bits as the first ARI, but may designate only M states.

Determination of ACK/NACK Payload Size

When N DL cells are configured in the existing LTE system and when a PUCCH format 3 is used, ACK/NACK bits corresponding to the N DL cells are all transmitted always. A size of an ACK/NACK payload of the PUCCH format 3 is determined according to the number of configured all DL cells. However, even if the number of configured cells is great, the number of cells in which actual PDSCH data is scheduled may be less than that number.

Therefore, it is proposed a method of determining a size of an ACK/NACK payload of a PUCCH format in every subframe by using a set of sizes of limited ACK/NACK payloads. A PUCCH format to which the present embodiment is applied may be PUCCHz or PUCCHy.

(Method 1) A size of an ACK/NACK payload is determined according to the number of scheduled cells.

A cell in which PDSCH data is scheduled is called a scheduled cell. The size of the ACK/NACK payload may be determined according to the number of scheduled cells.

A size $n_p$ of available ACK/NACK payloads capable of being transmitted through the PUCCH format may be limited to a specific set $\{n_1, n_2, \ldots, n_{P-1}, n_P\}$. Herein, $n_1 < n_2 \ldots < n_{P-1} < n_P$. When there is a need to transmit m-bit ACK/NACK information, the wireless device may determine a minimum value less than m to an ACK/NACK payload size $n_p$. $n_p$ and m may be set to the number of bits to be subjected to ACK/NACK feedback or the number of cells to be subjected to ACK/NACK feedback. The number of scheduled cells may imply the number of cells corresponding to a maximum DAI value received by the wireless device. However, since the number of scheduled cells may be mismatched between the wireless device and the BS due to a PDCCH reception failure or the like, the BS may attempt decoding on a size of a plurality of ACK/NACK payloads.

If there is a PDSCH having no DAI (e.g., a PDSCH or the like transmitted without a PDCCH), the size of the ACK/NACK payload may be determined in the following manner.

First, a value obtained by adding the number of PDSCHs having no DAI to the number of PDSCHs calculated as the DAI value is set to m, and the size of the ACK/NACK payload is determined.

Second, m is set according to the number of PDSCHs calculated as the DAI value, and the number of PDSCHs having no DAI is added to m to determine the ACK/NACK payload size.

(Method 2) The size of the ACK/NACK payload is determined according to the scheduled cell group.

A cell configured for a wireless device is divided into P groups, and a size of a available ACK/NACK payload that can be transmitted through a PUCCH format is limited to $\{n_1, n_2, \ldots n_{P-1}, n_P\}$. Herein, $n_1 < n_2 \ldots < n_{P-1} < n_P$). $n_j$ implies a size of an ACK/NACK payload corresponding to a cell belonging to groups $1, 2, \ldots, j$, that is, from a $1^{st}$ group to a j-th group.

The wireless device determines an ACK/NACK payload size corresponding to $n_j$ when the cell group is at most the j-th group, and transmits ACK/NACK information for cells corresponding to the $1^{st}$ group to the j-th group. However, since the number of scheduled cells may be mismatched between the wireless device and the BS due to a PDCCH reception failure or the like, the BS may attempt decoding on a size of a plurality of ACK/NACK payloads.

A minimum size $n_1$ in the set of payload sizes is equal to or greater than the minimum number of ACK/NACK bits (or ACK/NACK payload size corresponding to the minimum number of scheduled cells) that can be transmitted by the wireless device through the PUCCH format. The maximum size $n_p$ is greater than or equal to the maximum number of ACK/NACK bits (or an ACK/NACK payload size corresponding to the maximum number of scheduled cells) that can be transmitted through the PUCCH format. $n_p$ may be a size of an ACK/NACK payload corresponding to the total number of cells configured for the wireless device. $n_p$ may be a size of an ACK/NACK payload corresponding to the total number of activated cells configured for the wireless device.

Now, selection of a PUCCH format based on a DAI and ACK/NACK information transmission will be described.

DCI may include a DAI and a total DAI. The total DAI may be a value capable of estimating the total number of DL grants transmitted by a BS (or the total number of PDSCHs transmitted by the BS). A selected PUCCH format may have a smallest maximum payload greater than the number of bits of ACK/NACK information corresponding to the total number of DL grants estimated from the total DAI. An ARI may indicate a resource of a determined PUCCH format.

The total DAI may be expressed by one value corresponding to 'ACK/NACK bits more than (exceeding) X bits' and one or more values corresponding to 'ACK/NACK bits less than (below) X bits'. The X bit is a boundary point at which CRC is attached to a bit-stream of ACK/NACK information, and it is assumed that the CRC is not attached if the number of bits of ACK/NACK information is less than (below) X bits. Since the CRC is attached when the number of ACK/NACK bits to be transmitted is more than (exceeds) X bits, the BS may determine the ACK/NACK size by performing CRC checking on the number of available ACK/NACK bits. The CRC is not attached when ACK/NACK information less than (below) X bits is transmitted. Therefore, the wireless device may transmit ACK/NACK information of which the number of bits is designated by the total DAI.

As described above, the c-DAI has a successively increasing value for the PDSCH scheduled for different cells, and the t-DAI may have a value which increases for each subframe in which a PDSCH is scheduled for each cell. In addition, the cc-DAI is a value counted by being included in DCI of all subframes and all cells to be scheduled.

Figure 30:
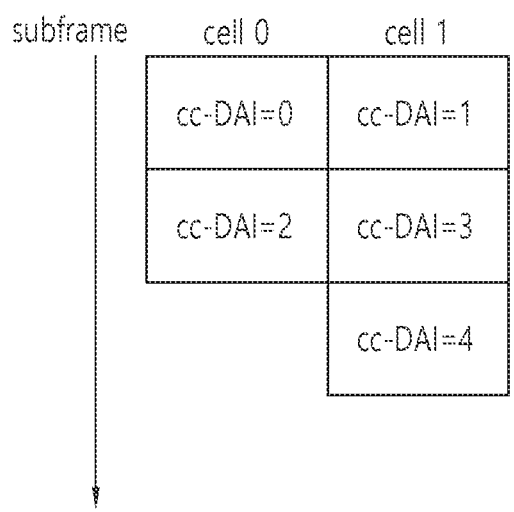
FIG. 30 shows an example of a cc-downlink assignment index (DAI).

FIG. 30 shows an example of a cc-DAI. Assume that there are two cells, i.e., cell 0 and cell 1, and there is DCI having a DL grant for each subframe. In the same subframe, a cell having a low cell index is prioritized, and the cc-DAI is counted. In the present specification, the DAI may include the cc-DAI.

Assume that information regarding a size of an ACK/NACK payload is included in DCI to be scheduled. When ACK/NACK information for a plurality of PDSCHs to be transmitted through M subframes is transmitted through one UL subframe as in the TDD system, a BS may not be able to determine the ACK/NACK payload size until PDSCH scheduling is complete for M subframes. If the determining of scheduling for the M subframes is not complete until a DL grant is configured for a first subframe among the M subframes, the ACK/NACK payload size may differ depending on the DL grant. Therefore, the following method is proposed.

The wireless device may select a PUCCH format or may configure an ACK/NACK payload through DCI in a most recently received subframe among the M subframes.

The wireless device may select a PUCCH format or configure the ACK/NACK payload according to a cell group corresponding to the entire DCI received among the M subframes or an indicated ACK/NACK payload.

The DL grant may include a DAI and a total DAI. The wireless device may select the PUCCH format or configure the ACK/NACK payload according to an indication of a DL grant corresponding to a received last DAI value (or a greatest DAI value). The wireless device may select the PUCCH format or configure the ACK/NACK payload according to an indication of a DL grant corresponding to a received last total DAI value (or a greatest total DAI value).

The wireless device may select the PUCCH format or configure the ACK/NACK payload according to an accumulation value of all received DAIS. The wireless device may select a PUCCH format or configure an ACK/NACK payload according to an accumulation value of all received total DAIs.

The number of ACK/NACK bits transmitted through PUCCHz in the aforementioned methods may be determined according to the number of scheduled cells, a cell ID, a cell group ID, or the like for each subframe. The number of ACK/NACK bits to be transmitted through PUCCHy may be fixed. The wireless device may transmit NACK (or DTX) in a place of an ACK/NACK bit corresponding to cells in which a PDSCH for actually feeding back ACK/NACK is not scheduled. In particular, it may be applied to a case where CRC is not attached to an ACK/NACK bit to be transmitted through PUCCHy, and there is an advantage in that the BS does not have to separately detect a size of ACK/NACK to be transmitted through PUCCHy.

ACK/NACK Information Classification in the Same ACK/NACK Payload Size

Even if a PUCCH format selected by a wireless device and an ACK/NACK payload size of the PUCCH format are determined, if a configuration of ACK/NACK information actually transmitted is different, the wireless device may need to inform a BS of a method of configuring the ACK/NACK information.

For example, assume that there is a cell group A and a cell group B, and that the wireless device selects a PUCCH format to transmit an ACK/NACK according to a cell group for receiving a PDSCH. PUCCHy is selected when PDSCH is received only through the cell group A, and the wireless device transmits the ACK/NACK information through the PUCCHy. In this case, the wireless device may transmit additional information on a PUCCH to inform a certain cell group of which ACK/NACK information is informed by the PUCCHy.

A plurality of transport blocks may be transmitted on one PDSCH through multiple input multiple output (MIMO). Regarding ACK/NACK spatial bundling, the following method may be applied to PUCCH selection. 'Nb' denotes the number of ACK/NACK bits to be transmitted when spatial bundling is not applied in a UL subframe, and 'Nr' denotes the number of ACK/NACK bits to be transmitted when spatial bundling is applied in the UL subframe.

- A PUCCH format capable of transmitting at least Nb bits (with a smallest payload size) is selected, and spatial bundling is not applied. When a PUCCH format with a greatest payload size cannot accommodate the Nb bits, the spatial bundling is applied. In addition, the PUCCH format is selected on the basis of Nr bits.
- A PUCCH format capable of transmitting at least Nr bits (with a smallest payload size) is selected. If the selected PUCCH format cannot accommodate at least Nb bits, spatial bundling is not applied. Otherwise, the spatial bundling is applied.

The selected PUCCH format may include additional information indicating whether spatial bundling is applied to ACK/NACK information. When the spatial bundling is applied according to the required number of ACK/NACK bits, the selected PUCCH format may include additional information indicating whether the spatial bundling is applied to the ACK/NACK information. The additional information may be transmitted in a form of CRC masking of the ACK/NACK information, a scrambling sequence of the ACK/NACK information, a sequence masked to DMRS of the PUCCH, or the like.

Assume that Nbmax denotes the maximum number of ACK/NACK bits that can be transmitted in the selected PUCCH format. If Nr<=Nbmax<Nb, the spatial bundling may be applied, and if Nb<Nbmax, the spatial bundling may not be applied. The number of bits of the ACK/NACK information varies depending on whether the spatial bundling is applied, and this may cause complexity of ACK/NACK decoding of a BS. In order to avoid this, additional bits of Nb-Nr may be added to the ACK/NACK information when the spatial bundling is applied. That is, the PUCCH format always transmits information of Nb bits regardless of whether the spatial bundling is applied. The Nb-bit ACK/NACK information or the Nr-bit ACK/NACK information may be selected on the basis of a scheduled cell, an activated cell, or a configured cell.

Figure 31:
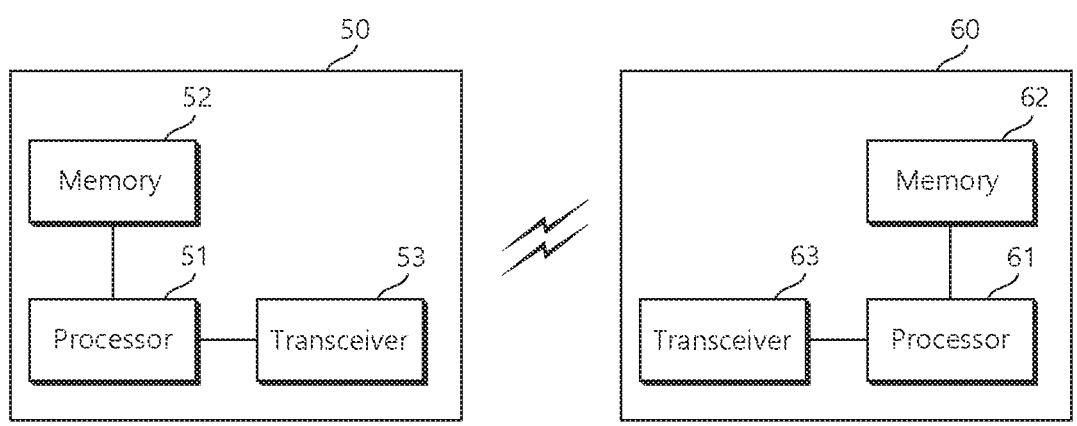
FIG. 31 is a block diagram showing a wireless communication system according to an embodiment of the present invention.

FIG. 31 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, a UL control operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a positive-acknowledgement/negative-acknowledgement (ACK/NACK) in a wireless communication system, the method performed by a wireless device and comprising:
   receiving, at a plurality of times, a plurality of downlink grants for scheduling a plurality of physical downlink shared channels (PDSCHs), each downlink grant including an ACK/NACK resource indicator (ARI);
   receiving the plurality of PDSCHs associated with the plurality of downlink grants;
   generating ACK/NACK bits for the received plurality of PDSCHs;
   selecting one of a plurality of sets of physical uplink control channel (PUCCH) resources for transmitting uplink control information (UCI) which includes the ACK/NACK bits for the plurality of PDSCHs;
   determining a PUCCH resource within the selected set of PUCCH resources based on an ARI that was included in a downlink grant among the plurality of downlink grants, wherein the downlink grant is received at a most recent time among the plurality of times at which the plurality of downlink grants were received; and
   transmitting the UCI on the determined PUCCH resource.

2. The method of claim 1, wherein each downlink grant further includes a total downlink assignment index (DAI), the total DAI representing a total number of PDSCHs received by the wireless device for a corresponding downlink grant.

3. The method of claim 1, wherein the ARI has at least two bits.

4. The method of claim 1, wherein the determined PUCCH resource includes information on a number of resource blocks assigned to an associated PUCCH format.

5. A device configured to transmit a positive-acknowledgement/negative-acknowledgement (ACK/NACK) in a wireless communication system, the device comprising:
- a processor; and
- a memory operatively coupled with the processor and configured to store instructions that, when executed by the processor, cause the device to perform functions comprising:
  - receiving, at a plurality of times, a plurality of downlink grants for scheduling a plurality of physical downlink shared channels (PDSCHs), each downlink grant including an ACK/NACK resource indicator (ARI);
  - receiving the plurality of PDSCHs associated with the plurality of downlink grants;
  - generating ACK/NACK bits for the received plurality of PDSCHs;
  - selecting one of a plurality of sets of physical uplink control channel (PUCCH) resources for transmitting uplink control information (UCI) which includes the ACK/NACK bits for the plurality of PDSCHs;
  - determining a PUCCH resource within the selected set of PUCCH resources based on an ARI that was included in a downlink grant among the plurality of downlink grants, wherein the downlink grant is received at a most recent time among the plurality of times at which the plurality of downlink grants were received; and
  - transmitting the UCI on the determined PUCCH resource.

6. The device of claim 5, wherein each downlink grant further includes a total downlink assignment index (DAI), the total DAI representing a total number of PDSCHs received by the wireless device for a corresponding downlink grant.

7. The device of claim 5, wherein the ARI has at least two bits.

8. The device of claim 5, wherein the determined PUCCH resource includes information on a number of resource blocks assigned to an associated PUCCH format.

* * * * *